(12) United States Patent
Bastian et al.

(10) Patent No.: US 11,378,116 B2
(45) Date of Patent: Jul. 5, 2022

(54) FURNITURE ASSEMBLY

(71) Applicant: MCS INDUSTRIES, INC., Easton, PA (US)

(72) Inventors: Geoffrey William Bastian, Wind Gap, PA (US); Michael Lee Pyle, Sugar Grove, IL (US); Matthew Scott Kressin, Allentown, PA (US); Robert Terry Coyle, Jr., Palmer, PA (US)

(73) Assignee: MCS INDUSTRIES, INC.

( * ) Notice: Subject to any disclaimer, the term of this patent is extended or adjusted under 35 U.S.C. 154(b) by 179 days.

(21) Appl. No.: 16/542,600

(22) Filed: Aug. 16, 2019

(65) Prior Publication Data

US 2020/0063776 A1 Feb. 27, 2020

Related U.S. Application Data

(60) Provisional application No. 62/722,352, filed on Aug. 24, 2018.

(51) Int. Cl.
*F16B 12/22* (2006.01)
*F16B 12/12* (2006.01)
(Continued)

(52) U.S. Cl.
CPC ............ *F16B 12/22* (2013.01); *F16B 5/0032* (2013.01); *F16B 12/125* (2013.01); *F16B 12/24* (2013.01); *F16B 21/09* (2013.01)

(58) Field of Classification Search
CPC ... A47B 57/482; A47B 57/485; A47B 57/487; A47B 57/50; A47B 2230/0077;
(Continued)

(56) References Cited

U.S. PATENT DOCUMENTS 3,265,344 A 8/1966 Ornstein
3,894,377 A 7/1975 Welch
(Continued)

FOREIGN PATENT DOCUMENTS

| AT | 505626 | 3/2009 |
| BE | 815124 | 5/1976 |

(Continued)

OTHER PUBLICATIONS

Amazon.com. "C.H. Yates Rubber 3143-4 3" Bow Roller 1/2" Shaft" First reviewed Jan. 8, 2015. Retrieved Jul. 14, 2021. (https://www.amazon.com/C-H-Yates-Rubber-3143-4-Roller/dp/B00O0I3F7Y/ref=sr_1_4?dchild=1 &keywords=yates+rubber+roller&qid=1632772257&sr=8-4) (Yaer: 2015).

*Primary Examiner* — Josh Skroupa
(74) *Attorney, Agent, or Firm* — Belles Katz LLC

(57) ABSTRACT

A furniture assembly and/or a mechanical coupling system for coupling furniture parts together to form an assembled article of furniture. The furniture assembly may include first and second furniture parts, each of which includes a board or other structural member and a coupler. The first furniture part may include a male coupler attached to the board and the second furniture part may include a female coupler attached to the board. The male and female couplers may be coupled together to thereby couple the first and second furniture parts together to form the assembled article of furniture. The male and female couplers may include engagement features that facilitate the coupling of the furniture parts together and to prevent them from becoming detached during normal use of the assembled article of furniture.

18 Claims, 30 Drawing Sheets

(51) Int. Cl.
*F16B 5/00* (2006.01)
*F16B 21/09* (2006.01)
*F16B 12/24* (2006.01)

(58) Field of Classification Search
CPC .. A47B 2230/16; F16B 5/0032; F16B 5/0036; F16B 5/0052; F16B 12/125; F16B 12/22; F16B 12/24; F16B 12/34; F16B 12/36; F16B 21/09; F16B 2200/30; Y10T 403/7094; Y10T 403/73
USPC .................. 403/DIG. 10, DIG. 13
See application file for complete search history.

(56) References Cited

U.S. PATENT DOCUMENTS

| | | | |
|---|---|---|---|
| 4,251,969 A | 2/1981 | Bains | |
| 4,258,464 A | 3/1981 | Ullman, Jr. | |
| 4,353,663 A * | 10/1982 | Glickman | F16B 12/20 403/230 |
| 4,363,201 A | 12/1982 | Bains | |
| 4,587,788 A | 5/1986 | Bielicki | |
| 4,932,105 A | 6/1990 | Muller | |
| D333,178 S | 2/1993 | Novy | |
| 5,433,416 A * | 7/1995 | Johnson | B65D 23/003 248/475.1 |
| 5,529,424 A | 6/1996 | Neubert | |
| D388,876 S | 1/1998 | Sampson | |
| 5,868,537 A | 2/1999 | Latal | |
| 6,904,835 B2 | 6/2005 | Dugan | |
| D625,977 S | 10/2010 | Watson | |
| 8,104,989 B2 * | 1/2012 | Liu | F16B 12/22 403/298 |
| 8,356,954 B2 * | 1/2013 | Koch | A47C 17/02 403/353 |
| 8,641,315 B2 * | 2/2014 | Liu | F16B 12/22 403/353 |
| D703,513 S | 4/2014 | Mistyurik | |
| 8,720,156 B2 | 5/2014 | Porter | |
| D733,265 S | 6/2015 | Eriksen | |
| D763,662 S | 8/2016 | Ezell | |
| 9,414,675 B2 | 8/2016 | Koelling et al. | |
| 9,447,804 B2 * | 9/2016 | Andersson | F16B 12/22 |
| D774,628 S | 12/2016 | Provenzano et al. | |
| 9,534,623 B2 | 1/2017 | Anderson et al. | |
| 9,677,589 B2 | 6/2017 | Koelling | |
| 9,765,529 B2 * | 9/2017 | Porter | E04F 13/0805 |
| 9,771,964 B2 | 9/2017 | Leveen et al. | |
| 9,810,253 B2 | 11/2017 | Koelling et al. | |
| 10,100,862 B2 * | 10/2018 | Yang | F16B 12/22 |
| 10,138,917 B2 * | 11/2018 | Koch | F16B 5/0614 |
| D835,244 S | 12/2018 | Khubani | |
| 10,211,608 B2 | 2/2019 | Weeks | |
| D846,367 S | 4/2019 | Romero, Jr. | |
| 10,280,960 B2 * | 5/2019 | Giovannetti | F16B 12/22 |
| D853,535 S | 7/2019 | Norton | |
| D859,134 S | 9/2019 | Iacono | |
| D865,917 S | 11/2019 | Naber | |
| 10,557,491 B2 * | 2/2020 | Schon | F16B 12/24 |
| 10,648,498 B2 * | 5/2020 | Sjostedt | F16B 21/09 |
| 10,722,029 B2 * | 7/2020 | Boone | F16B 12/46 |
| 10,844,891 B2 | 11/2020 | Maertens et al. | |
| 10,865,822 B2 * | 12/2020 | Andersson | A47B 47/042 |
| 2007/0025811 A1 | 2/2007 | Wilhelm | |
| 2008/0083865 A1 | 4/2008 | Matsui | |
| 2009/0058078 A1 | 3/2009 | Knudson | |
| 2009/0260390 A1 | 10/2009 | Rapp | |
| 2010/0166494 A1 * | 7/2010 | Cochard | F16B 21/09 403/52 |
| 2011/0085853 A1 | 4/2011 | Liu | |
| 2011/0204622 A1 | 8/2011 | Lewis | |
| 2011/0255915 A1 * | 10/2011 | Chen | F16B 12/125 403/381 |
| 2011/0260592 A1 * | 10/2011 | Lin | F16B 12/125 312/265.5 |
| 2012/0137624 A1 | 6/2012 | Sibbett | |
| 2012/0301217 A1 | 11/2012 | Liu et al. | |
| 2013/0239509 A1 * | 9/2013 | Wang | F16B 12/125 52/704 |
| 2015/0050081 A1 | 2/2015 | Andersson et al. | |
| 2015/0147113 A1 * | 5/2015 | Crabtree, II | F16B 12/22 403/292 |
| 2015/0219136 A1 | 8/2015 | Koelling | |
| 2015/0260325 A1 | 9/2015 | Quick | |
| 2015/0285284 A1 | 10/2015 | Koelling et al. | |
| 2015/0300393 A1 | 10/2015 | Leveen et al. | |
| 2015/0342349 A1 | 12/2015 | Koelling et al. | |
| 2015/0354612 A1 | 12/2015 | Koch | |
| 2017/0008161 A1 | 1/2017 | Weitsman | |
| 2017/0023043 A1 | 1/2017 | Koelling et al. | |
| 2017/0073961 A1 | 3/2017 | Porter | |
| 2017/0208774 A1 | 7/2017 | Kasper | |
| 2017/0297271 A1 | 10/2017 | Dizdar et al. | |
| 2018/0017091 A1 | 1/2018 | Schon | |
| 2018/0031019 A1 | 2/2018 | Sjostedt et al. | |
| 2018/0051734 A1 | 2/2018 | Koelling et al. | |
| 2018/0098627 A1 | 4/2018 | Savage | |
| 2018/0135799 A1 | 5/2018 | Dang | |
| 2018/0328395 A1 * | 11/2018 | Boone | F16B 12/36 |
| 2018/0328617 A1 | 11/2018 | Naber | |
| 2019/0211859 A1 * | 7/2019 | Liu | F16B 12/125 |
| 2020/0146447 A1 * | 5/2020 | Brendel | F16B 12/22 |

FOREIGN PATENT DOCUMENTS

| | | | |
|---|---|---|---|
| DE | 2135596 | 2/1973 | |
| DE | 2701833 A1 * | 7/1978 | F16B 12/24 |
| DE | 102007058662 A1 | 6/2009 | |
| FR | 1437325 | 4/1966 | |
| FR | 2109202 A5 * | 5/1972 | F16B 12/22 |
| GB | 2496613 A * | 5/2013 | F16B 12/22 |
| KR | 0129201 Y1 * | 3/1999 | F16B 12/22 |
| WO | WO0026545 | 5/2000 | |
| WO | WO 2016/137385 A1 | 9/2016 | |
| WO | WO 2017/105324 A1 | 6/2017 | |
| WO | WO 2017/160202 A1 | 9/2017 | |

* cited by examiner

FURNITURE ASSEMBLY

CROSS-REFERENCE TO RELATED APPLICATIONS

The present application claims priority to U.S. Provisional Patent Application Ser. No. 62/722,352, filed Aug. 24, 2018, the entirety of which is incorporated herein by reference.

BACKGROUND OF THE INVENTION

Furniture is often purchased in a disassembled state due to its large size so that it is easier to package and transport to the end-use location. In some instances, the store at which the furniture is purchased will deliver the furniture to the end-user's home and assemble the furniture for the consumer. In other instances, the consumer must assemble the furniture by him or herself. This can be a great source of frustration to the consumer because the assembly instructions are often difficult for a lay person to understand and the furniture parts often do not fit together readily and seamlessly. Thus, a need exists for a mechanical coupling system that can be used for the coupling of pieces of an article of furniture together to assemble the article of furniture.

SUMMARY OF THE INVENTION

The present invention is directed to a furniture assembly and/or a mechanical coupling system for coupling furniture parts together to form an assembled article of furniture. The furniture assembly may include first and second furniture parts, each of which includes a board or other structural member and a coupler. The first furniture part may include a male coupler attached to the board and the second furniture part may include a female coupler attached to the board. The male and female couplers may be coupled together to thereby couple the first and second furniture parts together to form the assembled article of furniture. The male and female couplers may include engagement features that facilitate the coupling of the furniture parts together and to prevent them from becoming detached during normal use of the assembled article of furniture.

In one aspect, the invention may be a furniture assembly comprising: a first furniture part comprising: a first board having at least one first aperture; and at least one male coupler coupled to the first board, the male coupler comprising a first portion positioned within the first aperture and a second portion protruding from the first board, the second portion comprising at least one first engagement feature; a second furniture part comprising: a second board having at least one second aperture; and at least one female coupler at least partially positioned within the second aperture and coupled to the second board, the female coupler comprising: a longitudinal axis; and an inner surface that defines a cavity comprising an insertion portion, a nesting portion, and a locking portion, a width of the cavity measured in a direction transverse to the longitudinal axis increasing from a first end of the nesting portion that is adjacent to the insertion portion to a second end of the nesting portion that is adjacent to the locking portion; and wherein the second portion of the male coupler is inserted into the insertion portion of the cavity of the female coupler and then slid to the locking portion of the cavity in a direction of the longitudinal axis of the female portion, the inner surface of the female coupler along the nesting and locking portions comprising at least one second engagement feature that mates with the first engagement feature of the male coupler to couple the first and second furniture parts to one another.

In another aspect, the invention may be a furniture assembly comprising: a first furniture part comprising: a first board having least one first aperture defined at least in part by a sidewall; and at least one male coupler comprising a first portion positioned within the first aperture and a second portion protruding from the first board, the first portion comprising a plurality of barbs that engage the sidewall of the first aperture to couple the male coupler to the first board; a second furniture part comprising: a second board having at least one second aperture defined by a sidewall and a floor; and at least one female coupler positioned within the second aperture, the female coupler comprising a top end, a bottom end, an outer surface comprising a plurality of barbs that engage the sidewall of the second aperture to couple the female coupler to the second board, and an inner surface that defines a cavity, the cavity comprising a first opening at the top end, a second opening at the bottom end, an insertion portion, and a nesting portion; and wherein the second portion of the male coupler is inserted through one of the first and second openings and into the insertion portion of the cavity of the female coupler in a first direction and then slid from the insertion portion of the cavity to the nesting portion of the cavity in a second direction that is perpendicular to the first direction, the inner surface of the female coupler along the nesting portion engaging the second portion of the male coupler to couple the first and second furniture parts to one another.

In yet another aspect, the invention may be a furniture assembly comprising: a first furniture part comprising: a first member having at least one first aperture; and at least one male coupler comprising a first portion positioned within the first aperture and a second portion protruding from the first member, the first portion comprising a plurality of barbs that engage the first member to couple the male coupler to the first member and the second portion comprising an outer surface having a first engagement feature; a second furniture part comprising: a second member having at least one second aperture; and at least one female coupler positioned within the second aperture, the female coupler being elongated along a longitudinal axis and comprising an outer surface comprising a plurality of barbs that engage the second member to couple the female coupler to the second member and an inner surface that defines a cavity comprising an insertion portion, a nesting portion, and a locking portion, a first portion of the inner surface located on a first side of the longitudinal axis and a second portion of the inner surface located on a second side of the longitudinal axis diverging from one another along the nesting portion of the cavity moving from the insertion portion towards the locking portion; wherein the male coupler is inserted into the insertion portion of the cavity of the female coupler and then slid in a direction of the longitudinal axis of the female coupler towards the locking portion of the cavity of the female coupler, the nesting and locking portions of the cavity comprising a second engagement feature that mates with the first engagement feature of the second portion of the male coupler to couple the male and female couplers and the first and second furniture parts to one another.

In a further aspect, the invention may be a mechanical coupling system for assembling an article of furniture, the mechanical coupling system comprising: a male coupler configured to be coupled to a first component of the article of furniture so that a first portion of the male coupler is embedded within the first component and a second portion of the male coupler protrudes from the first component, the second portion comprising an hourglass shape; a female coupler configured to be coupled to a second component of the article of furniture so that the female coupler is at least partially embedded within the second component, the female coupler comprising a top end, a bottom end, an outer surface having a plurality of barbs configured to engage the second component of the article of furniture to couple the female coupler thereto, and an inner surface defining a cavity having an insertion portion and a nesting portion, wherein the cavity comprises a first opening at the top end of the female coupler and a second opening at the bottom end of the female coupler; wherein the second portion of the male coupler can be inserted into and removed from the cavity of the female coupler through a portion of the first or second openings that is aligned with the insertion portion of the cavity of the female coupler; and wherein the second portion of the male coupler cannot be inserted into or removed from the cavity of the female coupler through a portion of the first or second openings that is aligned with the nesting portion of the cavity of the female coupler.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
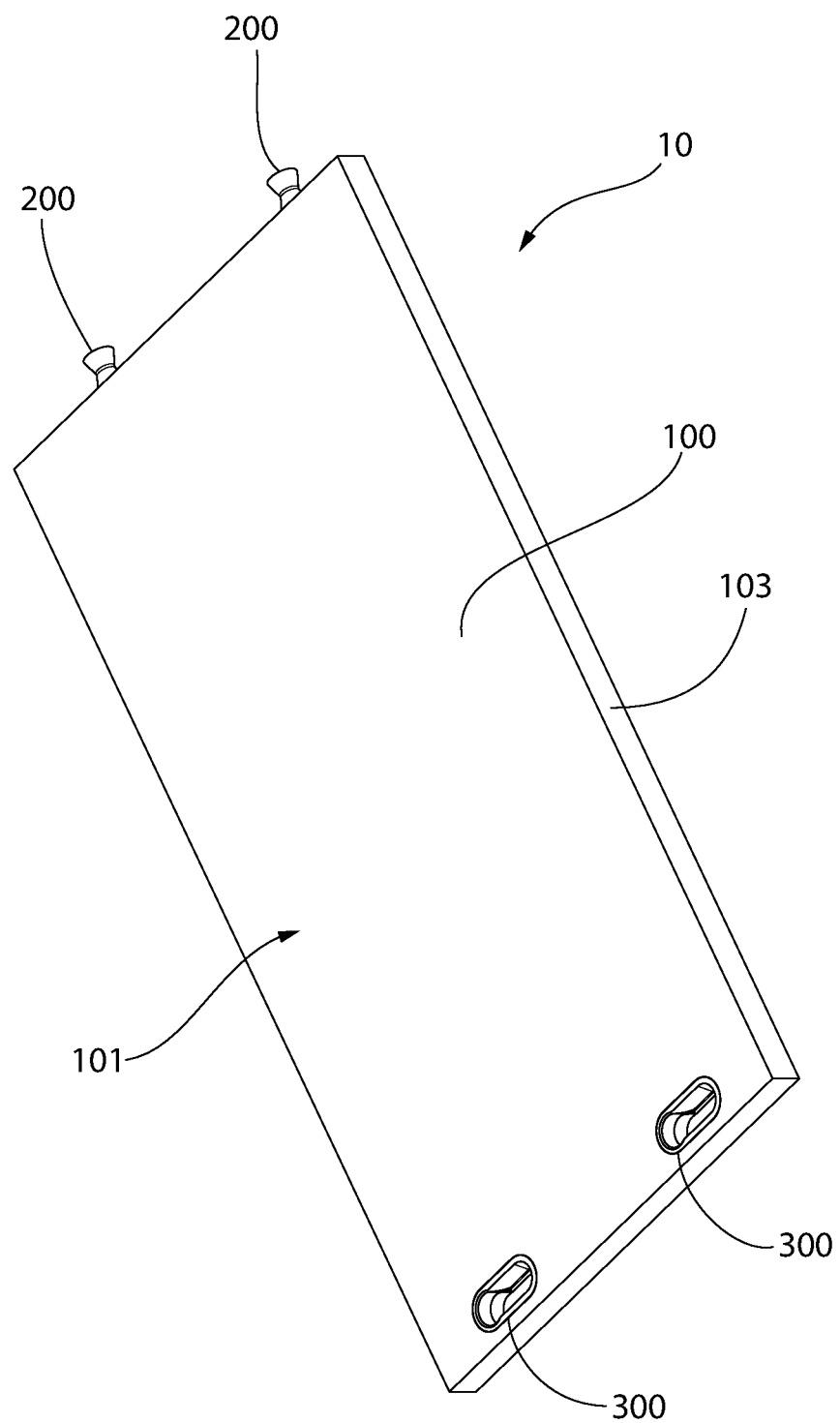
FIG. 1 is a front perspective view of a furniture part including a board with male and female couplers attached thereto in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
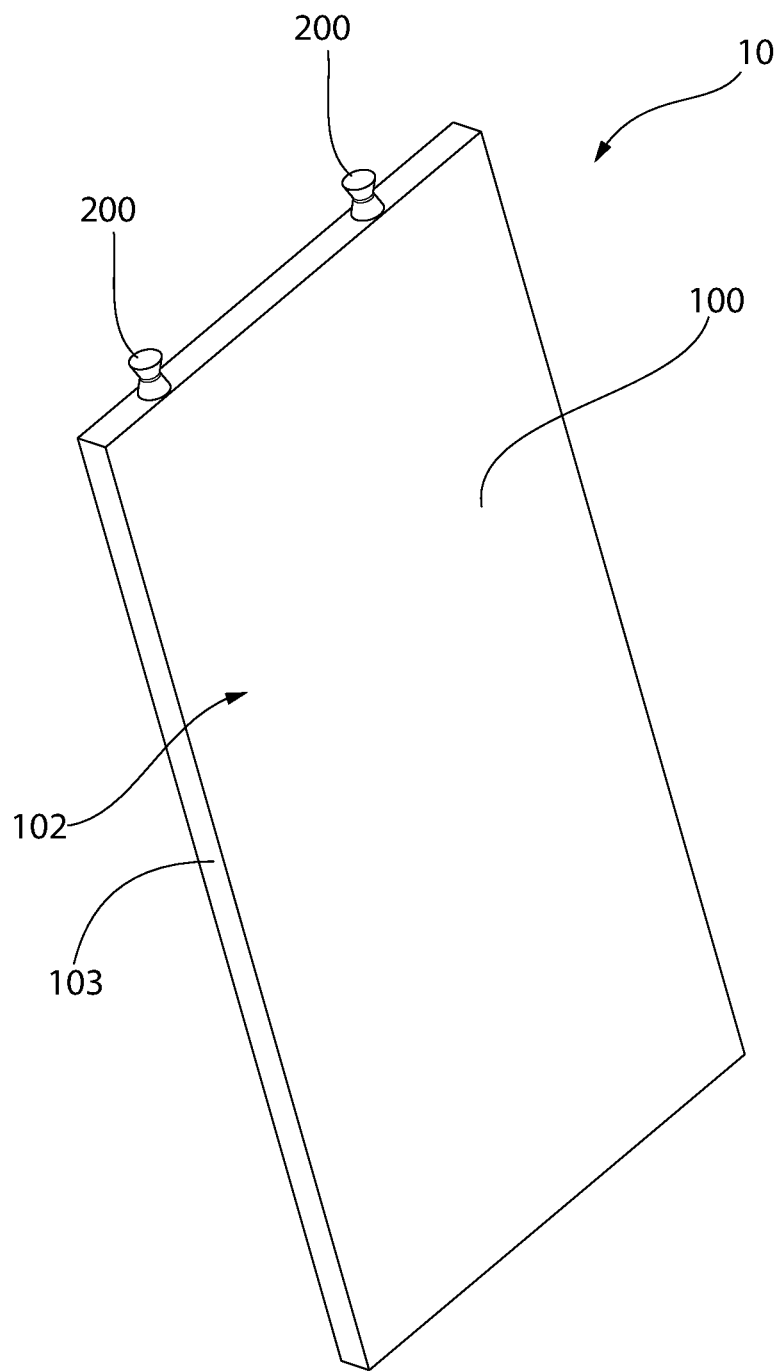
FIG. 2 is a rear perspective view of the furniture part of FIG. 1.

Referring to FIGS. 1 and 2, a furniture part 10 is illustrated in accordance with an embodiment of the present invention. In the exemplified embodiment, the furniture part 10 comprises a board 100, one or more male couplers 200, and one or more female couplers 300. Of course, in some embodiments the board 100 may include either male couplers 200 or female couplers 300, but not both. As shown, the one or more male and female couplers 200, 300 are coupled or attached to the board 100, the exact manner of such attachment being described in more detail below. In some embodiments, the furniture part 10 may be sold with the male and female couplers 200, 300 coupled to the board 100 at the positions and locations necessary to ensure that a plurality of the furniture parts 10 can be coupled together to form an assembled article of furniture. In some embodiments, the male and female couplers 200, 300 cannot be readily detached or otherwise separated from the boards 100 without causing damage to either the boards 100 or the male/female couplers 200, 300. In some embodiments, the male and female couplers 200, 300 may be collectively referred to herein as a mechanical coupling system. In other embodiments, two furniture parts, each including a board 100 and male/female couplers 200, 300 such that one of the boards includes male couplers 200 and another one of the boards 100 includes female couplers 300, may be referred to herein as a mechanical coupling system or a furniture assembly.

In the exemplified embodiment, there are two of the male couplers 200 and two of the female couplers 300 coupled to the board 100. However, there could be one or more than two of the male couplers 200 and one or more than two of the female couplers 300 coupled to the board 100 in other embodiments. Moreover, in still other embodiments there could be either one or more of the male couplers 200 and/or one or more of the female couplers 300 coupled to the board 100. Thus, there do not need to be both the male and female couplers 200, 300 attached to each board 100. The locations of the male and female couplers 200, 300 on the boards 100 are typically dictated by the manufacturer to make it easy for a consumer or end-user to assemble the furniture using the furniture parts 10.

In use, a plurality of different furniture parts 10 can be coupled together to form an assembled article of furniture by mating the male couplers 200 of one of the furniture parts 10 with the female couplers 300 of another one of the furniture parts 10 in accordance with instructions provided by the manufacturer. This assembly will be described in greater detail below with reference to FIGS. 7A-9B. The specific type of furniture that can be assembled using the furniture parts 10 is not limiting of the present invention. The specific type of furniture may include cabinets, sofas, tables, chairs, bookshelves, desks, bed frames, stools, stands, dressers, or any other type of furniture that can potentially be assembled by a consumer or end-user in their home or office.

In the exemplified embodiment, the board 100 is rectangular shaped, but the board 100 may take on any of a variety of different shapes including polygons, shapes that are not polygons, regular shapes, irregular shapes, or the like. Furthermore, although in the exemplified embodiment the board 100 is long and flat, it need not be flat in all embodiments but could include textures, contours, ridges, protuberances, hills, or the like on any of its surfaces or edges. In some embodiments, the board 100 need only form a part of an article of furniture so the final specifications of the article of furniture will dictate the shape and structure of the board 100. Thus, in some embodiments the shape of the board 100 is not to be limiting of the present invention. The board 100 may also be referred to herein as a panel, a substrate, or a support structure.

In the exemplified embodiment, the board 100 has a front surface 101, a rear surface 102, and an edge 103 extending between the front and rear surfaces 101, 102. The edge 103 is a peripheral edge that extends around an entirety of a periphery of the board 100. In the exemplified embodiment, the male couplers 200 are coupled to the board 100 along a portion of the edge 103 and the female couplers 300 are coupled to the board 100 along the front surface 101. However, the invention is not to be so limited and in other embodiments the male couplers 200 could be coupled to the front and/or rear surfaces 101, 102 and the female couplers 300 could be coupled to the rear surface 102 or the edge 103. In other embodiments, there may be male couplers 200 and female couplers 300 coupled to the edge 103 and/or male couplers and female couplers 200, 300 coupled to one or both of the front and rear surfaces 101, 102 of the board 100. The basic concept is that the male and female couplers 200, 300 are positioned on first and second boards 100 at a location that enables the first and second boards 100 (and the first and second furniture parts 10 that include the first and second boards 100 and the male and female couplers 200, 300) to be coupled together to form a part of an assembled piece of furniture.

There are two main advantages of the male and female couplers 200, 300. First, they enable articles of furniture to be assembled without the use of any tools much quicker than was previously possible. Specifically, there is no need for hammers, screw drivers, hex keys, Allen wrenches, or the like and the male and female couplers 200, 300 mate with one another readily and quickly during assembly. Furthermore, disassembly is just as easy as assembly and it can be accomplished without causing any damage to the furniture parts 10 so that the article of furniture can be reassembled at another location if so desired. Second, the male and female couplers 200, 300 are able to be used in boards of varying quality. The boards 100 to which the male and female couplers 200, 300 are coupled may be formed from fiberboard, which may include particle board (also referred to as low-density fiberboard, or LDF), medium density fiberboard (MDF) and hardboard (also referred to as high-density fiberboard, or HDF). In some embodiments, the boards 100 may be formed from a low quality or low grade particle board that is porous and has a low density. In some embodiments the density of the boards 100 may be in a range of 600-700 kg/m$^3$, or more specifically 600-650 kg/m$^3$ or in a range of 650-700 kg/m$^3$ or 650-680 kg/m$^3$. In some embodiments, the boards 100 may have a density that is below 700 kg/m$^3$. The material of such low grade particle board may include flakes of poplar, pine, or the like along with various binders such as glue and adhesives.

Figure 3A:
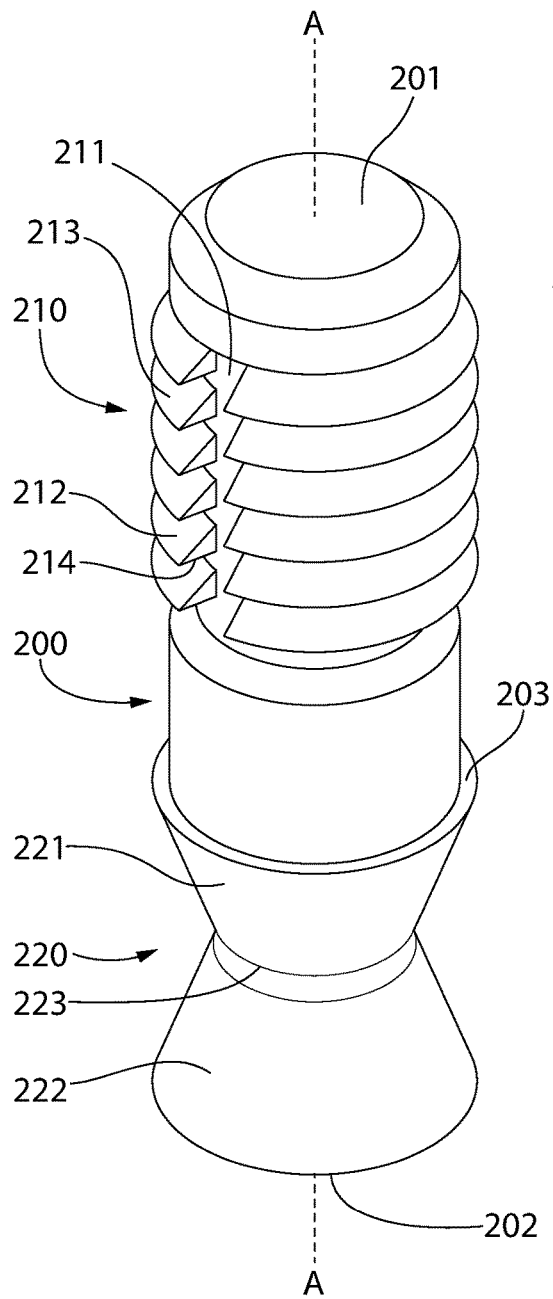
FIGS. 3A-3C are a top perspective view, a bottom perspective view, and a front view, respectively, of the male coupler of FIG. 1.
Figure 3B:
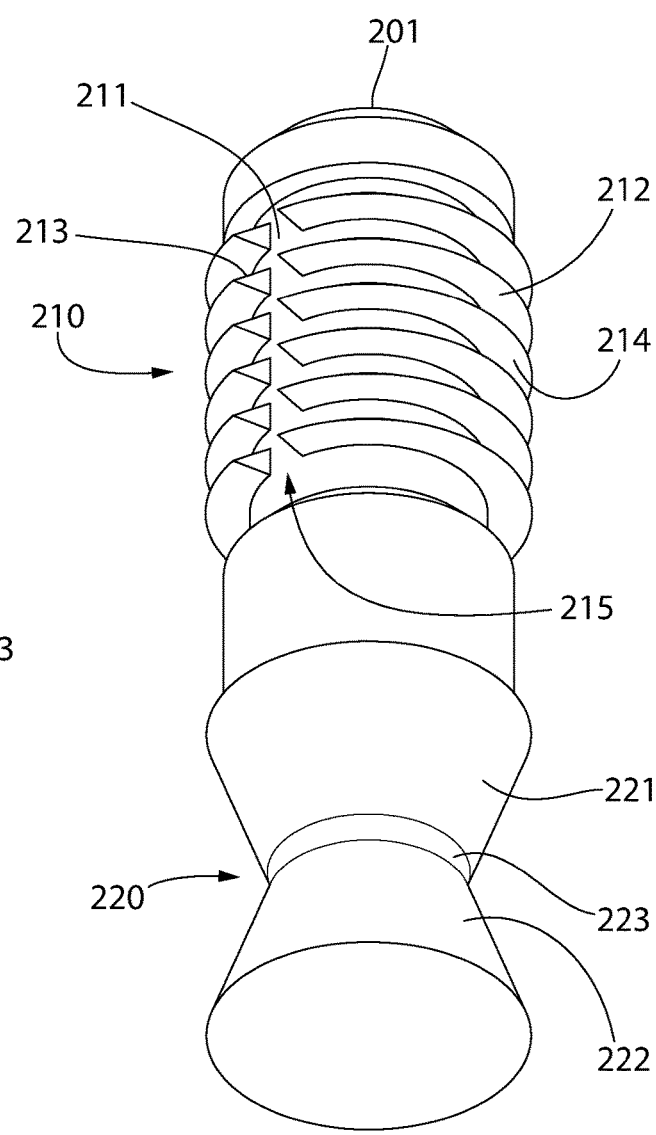
Figure 3C:
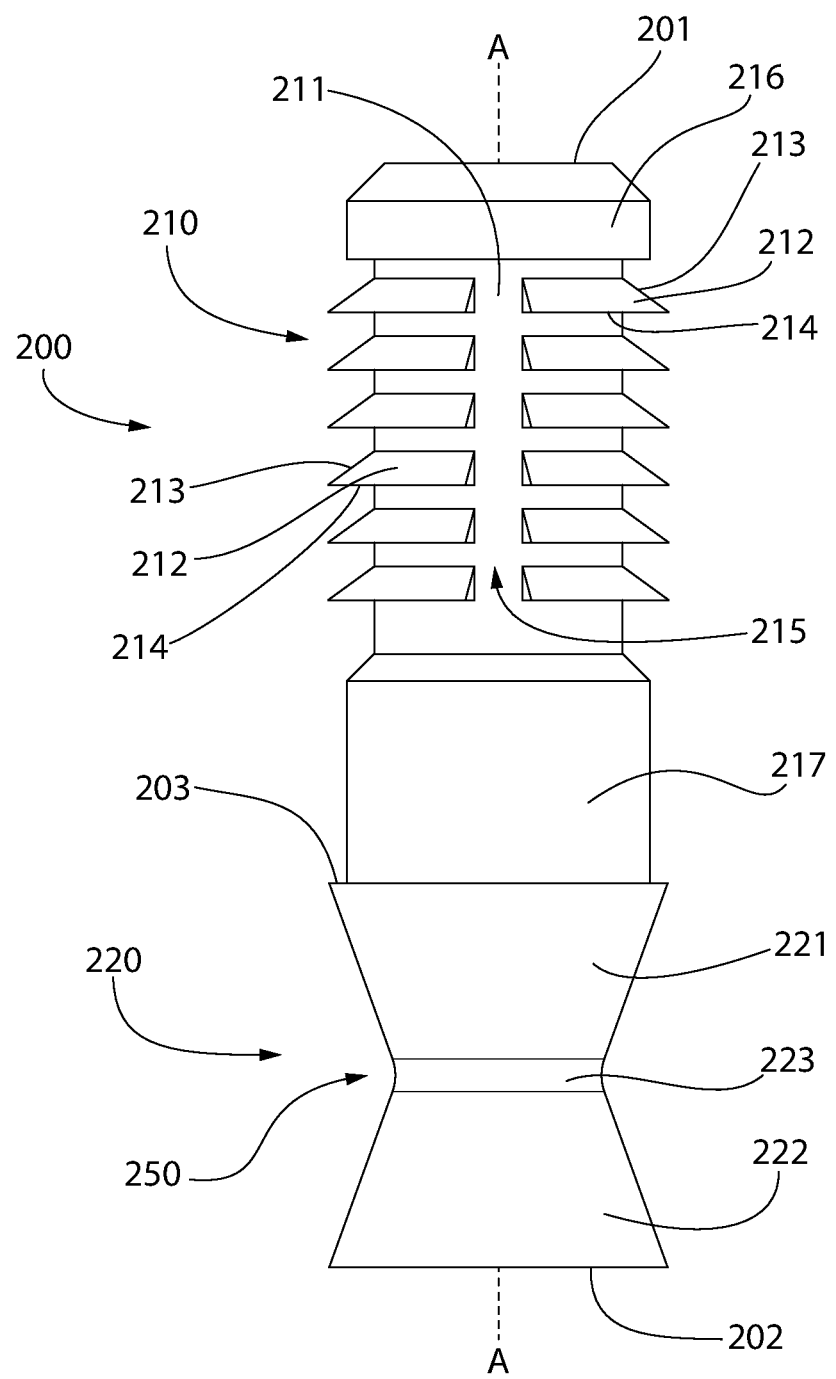

Referring to FIGS. 3A-3C, the male coupler 200 will be described in accordance with an embodiment of the present invention. The invention is not to be limited to the specific structural details of the male coupler 200 in all embodiments and structural modifications may be possible without affecting its function. In fact, two alternative embodiments of male couplers will be described below with reference to FIGS. 10A-11D and 12A-12D and it should be appreciated that even more alternative embodiments are possible.

The male coupler 200 may be formed from metal, plastic, or the like in various different embodiments. In one particular embodiment, the male coupler 200 may be formed from glass filled nylon. Of course, other materials are possible in other embodiments, including nylon and other thermoplastics such as polyethylene, polyvinyl chloride, polystyrene, polypropylene, or the like, although a strong and rigid material is preferable because it is being used to hold an assembled article of furniture together. The male coupler 200 could also be formed from wood or any of various metals in some embodiments. In some embodiments the male coupler 200 may be formed in an injection molding process, although it could also be formed by extrusion, 3D printing, or the like. As described below, the female coupler 300 may be formed from the same material as the male coupler 200 and in the same manufacturing process (e.g., injection molding, extrusion, 3D printing, or the like). As mentioned above, because the male and female couplers 200, 300 are the only components that serve to couple the various furniture parts 10 together, the male and female couplers 200, 300 should be formed from a strong, rigid material capable of supporting a reasonably large amount of weight and force.

The male coupler 200 extends along an axis A-A from a first end 201 to a second end 202. The male coupler 200 comprises a first portion 210 configured for coupling the male coupler 200 to the board 100 and a second portion 220 configured for coupling the male coupler 200 to one of the female couplers 300. The second portion 220 comprises a first engagement feature 250 that mates with an engagement feature of the female coupler 300 to achieve the coupling between those two components. The first portion 210 terminates at the first end 201 and the second portion 210 terminates at the second end 202. The male coupler 200 has a generally cylindrical shape.

The first portion 210 comprises a generally cylindrical body 211 and a plurality of barbs 212 protruding radially from the cylindrical body 211. The barbs 212 are axially spaced apart from one another along the length of the first portion 210 of the male coupler 200. Each of the barbs 212 has a top surface 213 that is angled obliquely relative to the axis A-A and a bottom surface 214 that is perpendicular relative to the axis A-A. The top surface 213 of the barbs 212 faces the first end 201 of the male coupler 200 and the bottom surface 214 of the barbs 212 faces the second end 202 of the male coupler 200. Due to the angles of the top and bottom surfaces 213, 214 of the barbs 212, the male coupler 200 can be inserted into an opening in one of the boards 100 with the first end 201 entering the opening first. Because the top surfaces 213 of the barbs 212 are angled, the barbs 212 will deflect as the male coupler 200 is inserted deeper into the opening in the board 100. Because the bottom surfaces 214 of the barbs 212 are perpendicular to the axis A-A, the barbs 212 will substantially prevent the male coupler 200 from being removed from the opening and detached from the board 100 once it is coupled thereto. Thus, in some embodiments the male coupler 200 can be coupled to the board 100 without any adhesives such as glue and without having to weld the male coupler 200 to the board 100. The barbs 212 create a sufficient coupling between the male coupler 200 and the board 100 to prevent it from being detached from the board 100 once installed. Of course, an adhesive such as glue could be used in some embodiments if needed in a particular situation.

In the exemplified embodiment, each of the barbs 212 extends circumferentially around an outer surface of the cylindrical body 211 of the first portion 210 of the male coupler 200. Specifically, each of the barbs 212 extends annularly around the cylindrical body 211 of the first portion 211 of the male coupler 200. In the exemplified embodiment, there is at least one gap 215 provided in each of the barbs 212 which allows the barbs 212 to have a greater degree of deflection as the first portion 210 of the male coupler 200 is being couple to the board 100 as described further herein below. More specifically, in the exemplified embodiment there are two gaps 215 in each of the barbs 212 and the gaps in all of the barbs 212 are aligned in a direction of the axis A-A. The barbs 212 are arranged along the cylindrical body 211 in a vertically spaced apart manner. The exact number of the barbs 212 may be dictated by the length of the cylindrical body 211 and the spacing between the barbs 212 and is not to be limiting of the present invention in all embodiments.

In the exemplified embodiment, the first portion 210 of the male coupler 200 also comprises a cap portion 216 that extends from the cylindrical body 211 to the first end 201 and a lower cylindrical body 217 that extends from the cylindrical body 211 to the second portion 220. In the exemplified embodiment, both the cap portion 216 and the lower cylindrical body 217 have a greater diameter than the cylindrical body 211. The cap portion 216 and the lower cylindrical body 217 are devoid of any barbs.

In the exemplified embodiment, the second portion 220 of the male coupler 200 has an hourglass like shape and its shape forms the first engagement feature 250. The second portion 220 of the male coupler 200 extends from the second end 202 of the male coupler 200 to a shoulder 203, with the shoulder 203 extending radially from an end of the lower cylindrical body 217 of the first portion 210 of the male coupler 200. When the first portion 210 of the male coupler 200 is inserted into an opening in the board 100, abutment of the shoulder 203 of the second portion 220 of the male coupler 200 with the board 100 indicates that the male coupler 200 is in a fully inserted position. Thus, no portion of the second portion 220 of the male coupler 200 is located within the board 100 but the entirety of the first portion 210 of the male coupler 200 is located within the board 100 in some embodiments. In other embodiments, only portions of the first portion 210 of the male coupler 200 may be positioned within the board 100.

The second portion 220 of the male coupler 200 includes an upper portion 221 that is adjacent to the first portion 210 and that includes the shoulder 203 and a lower portion 222 that extends to the second end 202 of the male coupler 200. The upper and lower portions 221, 222 are angled so as to converge at a waist region 223 of the second portion 220 of the male coupler 200. The upper and lower portions 221, 222 extend away from the axis A-A and diverge from one another with increasing distance from the waist region 223. Stated another way, each of the upper and lower portions 221, 222 are in the shape of a truncated triangle such that they are each truncated at the waist region 223.

In the exemplified embodiment, the waist region 223 of the second portion 220 of the male coupler 200 forms the first engagement feature 250. Thus, the first engagement feature 250 in this embodiment comprises a groove, recess, or channel that engages or otherwise mates with an engagement feature of the female coupler 300 to facilitate the coupling of the male coupler 200 to the female coupler 300. More specifically, the first engagement feature 250 is the groove in combination with the angled sidewalls of the outer surface of the second portion 220 of the male coupler 200 as best seen in FIG. 3C. This also facilitates the coupling of a first board 100 to a second board 100 when the male and female couplers 200, 300 are coupled to the first and second boards 100, respectively. Of course, the invention is not to be limited to the first engagement feature 250 being a groove or the like. In other embodiments, the first engagement feature 250 may be a protuberance and the second engagement feature of the female coupler 300 may be a groove, recess, or channel that receives the protuberance.

Referring to FIGS. 4A-4F, the female coupler 300 will be described in accordance with an embodiment of the present invention. Similar to the male coupler 200, the female coupler 300 may also be formed from plastic, wood, metal, or the like, with nylon or glass filled nylon being one preferable but non-limiting material. The female coupler 300 may be formed or manufactured from injection molding, extrusion, 3D printing, or any other technique known in the art. The female coupler 300 should be formed of a material with sufficient strength to enable the male and female couplers 200, 300 to mate with one another to assemble an article of furniture as described herein. In the exemplified embodiment, the female coupler 300 has a substantially oval shape. However, the invention is not to be limited by the shape of the female coupler 300 in all embodiments and the female coupler 300 may take on any desired shape, such as being square, rectangular, or the like. As long as the female coupler 300 is capable of mating or otherwise interacting with the male coupler 200 to mechanically couple those two components together, the shape of the female coupler 300 is not to be limiting of the invention in all embodiments.

The female coupler 300 comprises a body portion 309 that extends from a first end 301 to a second end 302 along an axis B-B. The female coupler 300 is elongated along a longitudinal axis C-C. The body portion 309 has an outer surface 303 and an inner surface 304. Furthermore, a plurality of barbs 310 extend from the outer surface 303 of the female coupler 300 for coupling the female coupler 300 to one of the boards 100. The barbs 310 are positioned in a spaced apart manner and extend around the entirety of the outer surface 303 (i.e. the barbs 310 are annular, although there may be gaps similar to that which was discussed above with regard to the barbs 212 of the male coupler 200). Each of the barbs 310 has a top surface 311 and a bottom surface 312. The top surfaces 311 of the barbs 310 are obliquely angled relative to the axis B-B and the bottom surfaces 312 of the barbs 310 are angled perpendicularly relative to the axis B-B. Thus, as the female coupler 300 is inserted into an opening in one of the boards 100 with the first end 301 entering the opening first, the angled top surfaces 311 of the barbs 310 permit the female coupler 300 to be inserted while the perpendicular bottom surfaces 312 prevent the female coupler 300 from be readily removed/detached from the board 100.

The body portion 309 of the female coupler 300 comprises a flange 317 located at or adjacent to the second end 302. The flange 317 protrudes from the outer surface 303 of the body portion 309 and in the exemplified embodiment is a continuous, uninterrupted protrusion.

The female coupler 300 comprises a cavity 305 that extends along the axis B-B, which may also be referred to herein as the cavity axis B-B. The cavity 305 is defined by the inner surface 304. In the exemplified embodiment, the cavity 305 is open at each of the first and second ends 301, 302 of the female coupler 300. Thus, in the exemplified embodiment there is a first opening 318 in the first end 301 and a second opening 319 in the second end 302. As a result, the cavity 305 extends entirely through the body portion 309 of the female coupler 300. By having the cavity 305 open at both of the first and second ends 301, 302 of the body portion 309 of the female coupler 300, the female coupler 300 has an added flexibility which allows for the female coupler 300 to be slightly compressed when the female coupler 300 is inserted into an opening in a board. As will be described in more detail below, this facilitates creating a secure connection between the male and female couplers 200, 300. However, it should be noted that in some alternative embodiments the cavity 305 may be closed at one end and open at the other.

The cavity 305 comprises an insertion portion 306, a nesting portion 307, and a locking portion 308. The nesting portion 307 is positioned between the insertion portion 306 and the locking portion 308. Specifically, the nesting portion 307 extends from a first end 360 that is adjacent to the insertion portion 306 to a second end 361 that is adjacent to the locking portion 308. The insertion portion 306 is the portion of the cavity 305 within which the male coupler 200 is received during coupling of two boards 100 together. Specifically, the male coupler 200 is configured to fit through portions of the openings 318, 319 that are aligned with the insertion portion 306 of the cavity 305, but the male coupler 200 may not fit within portions of the openings 318, 319 that are aligned with the nesting and locking portions 307, 308 of the cavity 305.

The nesting portion 307 is the portion of the cavity 305 within which the male coupler 200 first becomes coupled to the female coupler 300 in the sense that the male coupler 200 cannot be removed axially from the cavity 305 when it is in the nesting portion 307. (i.e., the male coupler 200 becomes locked to the female coupler 300 in the axial direction (i.e., in the direction of the axes A-A, B-B). The locking portion 308 of the cavity 305 is the end of the cavity 305 that is opposite the insertion portion 306 and it is located where the sidewalls of the cavity 305 (or the inner surface 304) begin to curve into a semicircular shape.

The female coupler 300 comprises a second locking feature 370 that is configured to mate or otherwise interact with the first engagement feature 250 of the male coupler 200 to couple the male coupler 200 to the female coupler 300. In the exemplified embodiment, the second locking feature 370 is a protuberance. Specifically, in the exemplified embodiment the inner surface 304 of the female coupler 300 comprises a protuberance 350 that has a shape that corresponds with the shape of the outer surface of the male coupler 200 along the second portion 220 of the male coupler 200. Specifically, the inner surface 304 of the female coupler 300 comprises a first portion 320 and a second portion 321 that are angled relative to the axis B-B so as to converge at a middle portion 322. In the exemplified embodiment, the middle portion 322 forms an apex of the protuberance 350. The first and second portions 320, 321 diverge from one another and from the axis B-B with increasing distance from the middle portion 322. Thus, the nesting portion 307 of the cavity 305 has an hourglass-like cross-sectional shape (best shown in FIG. 4E) that is similar to the hourglass-like shape of the second portion 220 of the male coupler 200. Thus, the middle portion or apex 322 of the protrusion 350 forms the second locking feature 370 and it nests within the groove of the waist portion 223 of the second portion 220 of the male coupler 200 to couple those two components together.

As seen, the first portion 320 lies on a first plane P1 and the second portion 321 lies on a second plane P2. The first and second planes P1, P2 intersect one another at an obtuse angle at the apex 322. Furthermore, each of the first and second planes P1, P2 intersects the cavity axis B-B at a location that is external to the cavity 305. Moreover, a distance between the apex 322 of the protuberance 350 and the top end 302 of the female coupler 300 is constant along the nesting portion 307 of the cavity 305. Thus, the apex 322 lies on a third plane P3 and the top end 302 of the female coupler 300 lies on a fourth plane P4 that is parallel to the third plane P3. Thus, the apex 322 is not angled downwardly or upwardly as it moves along the nesting portion 307 of the cavity 305, but rather it is at a constant height along the inner surface 304 of the female coupler 300.

Figure 4A:
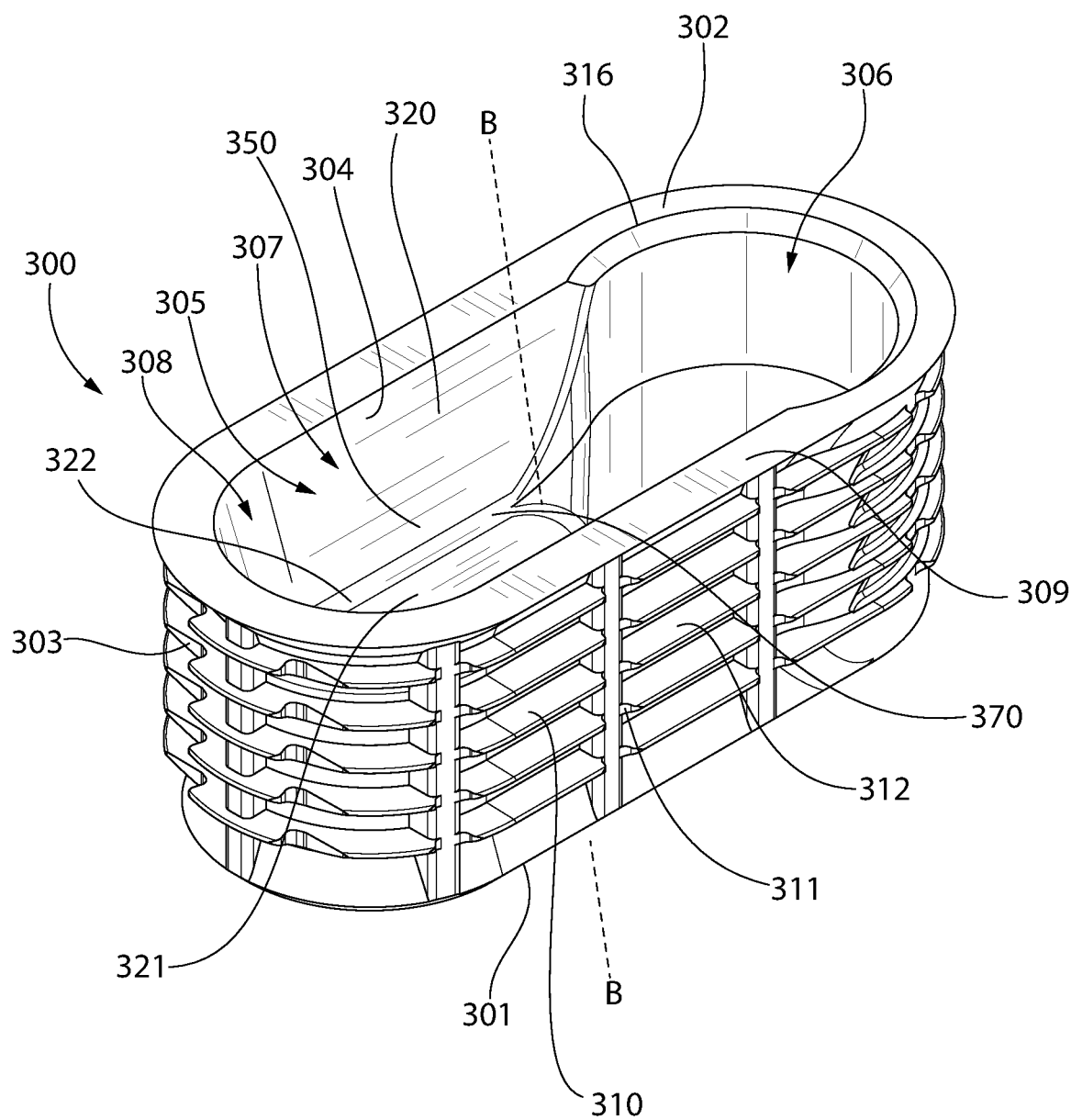
FIGS. 4A-4D are a top perspective view, a bottom perspective view, a top view, and a side view, respectively, of the female coupler of FIG. 1.
Figure 4B:
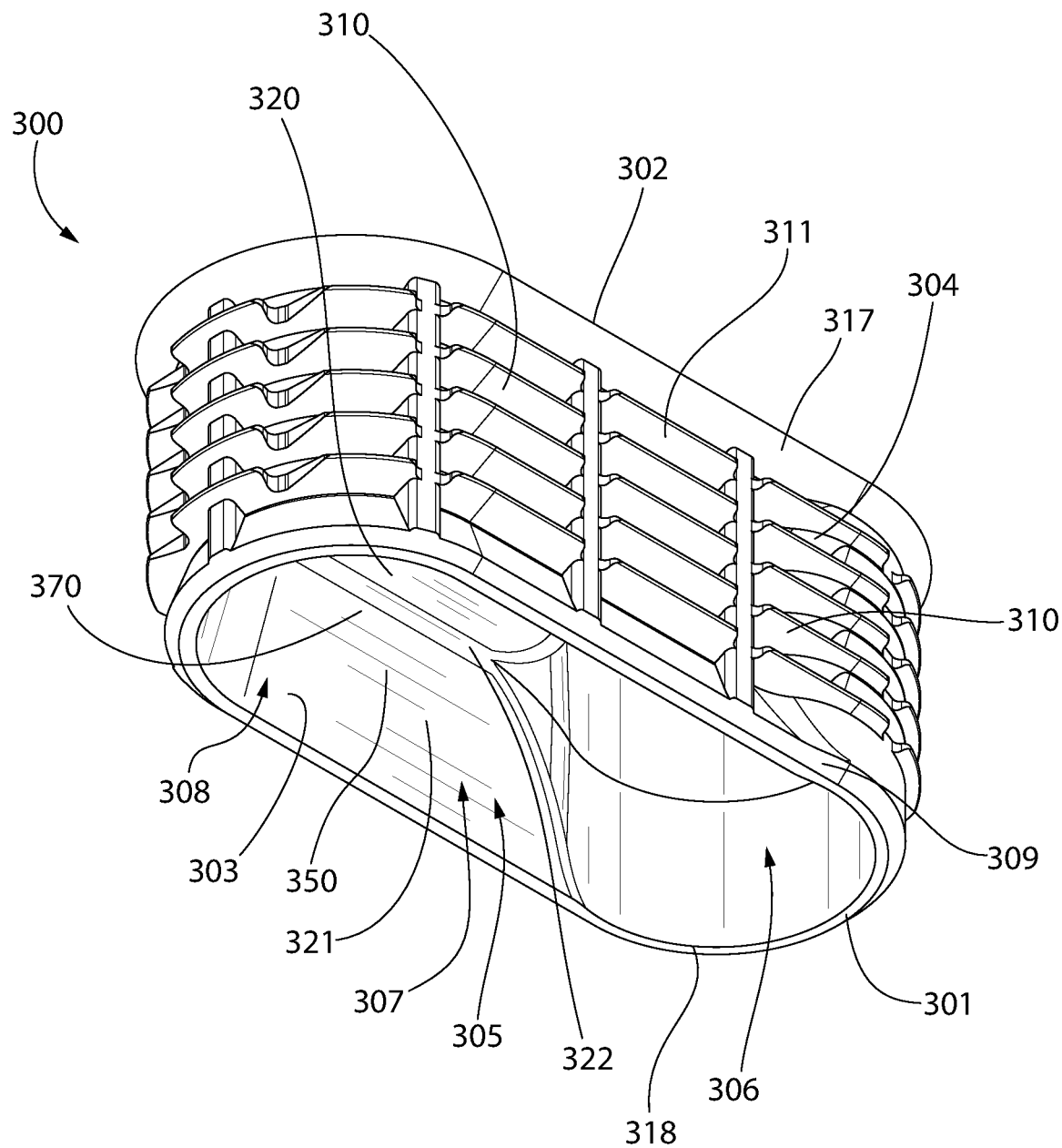
Figure 4C:
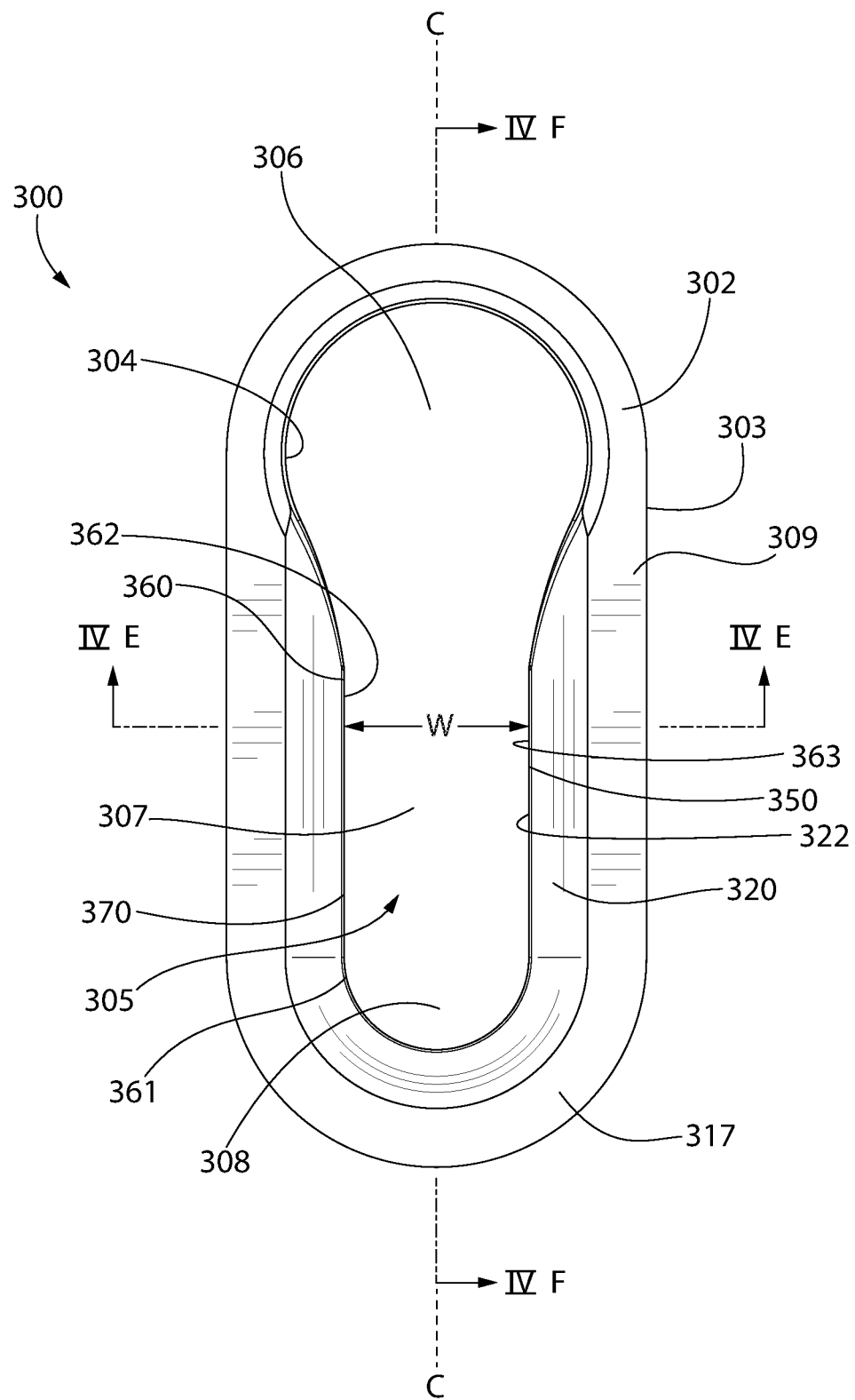
Figures 4D, 4E:
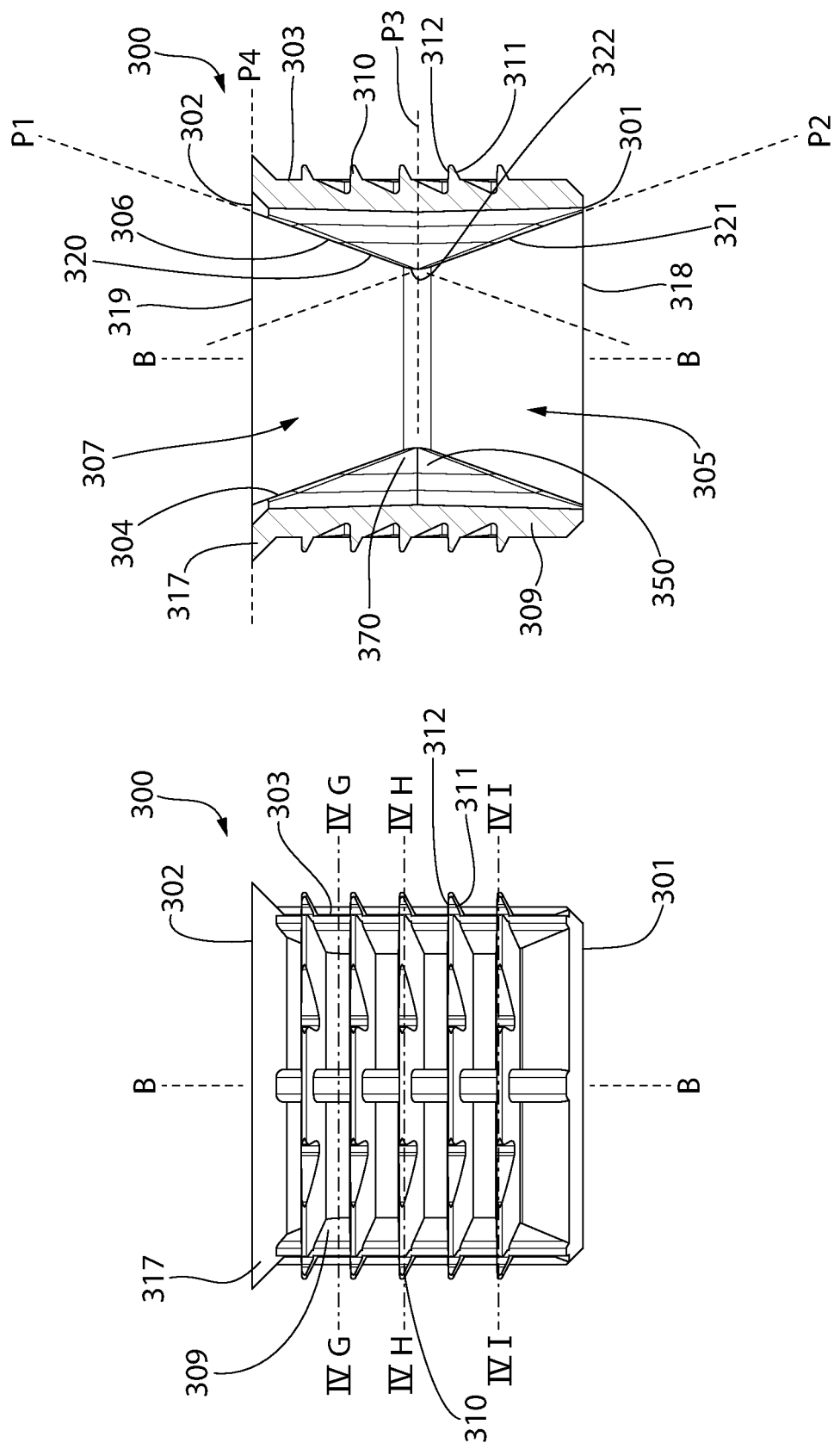
FIG. 4E is a cross-sectional view taken along line IVE-IVE of FIG. 4C.
Figure 4F:
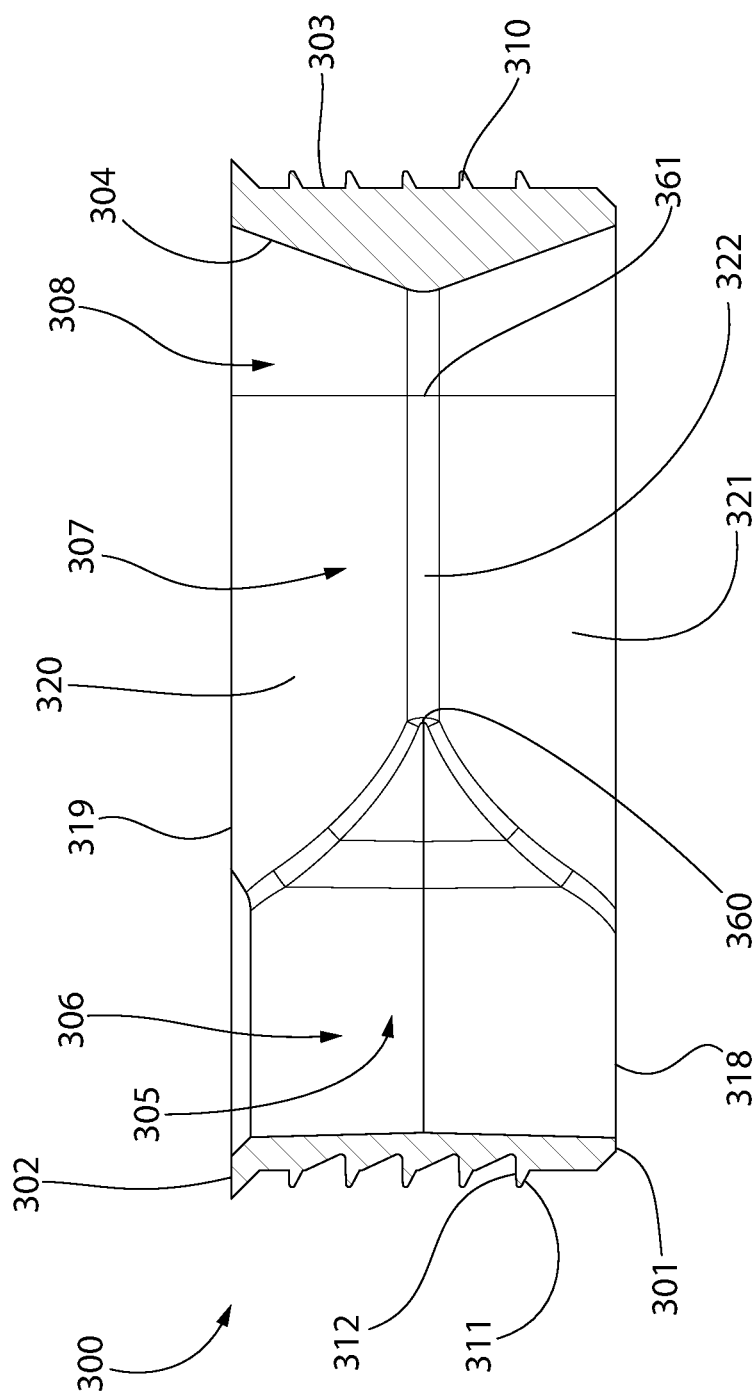
FIG. 4F is a cross-sectional view taken along line IVF-IVF of FIG. 4C.

As best seen in FIG. 4C, the inner surface 304 of the female coupler 300 comprises a first portion 362 located on a first side of the longitudinal axis C-C and a second portion 363 located on a second side of the longitudinal axis C-C. When in a non-compressed state (i.e., when not coupled to the board 100), the first and second portions 362, 363 of the inner surface 304 located along the nesting portion 307 of the cavity 305 are parallel to one another. Thus, the width W of the nesting portion 307 of the cavity 307 (measured at the apex 322) is constant along the nesting portion 307 of the cavity 305.

Figure 5:
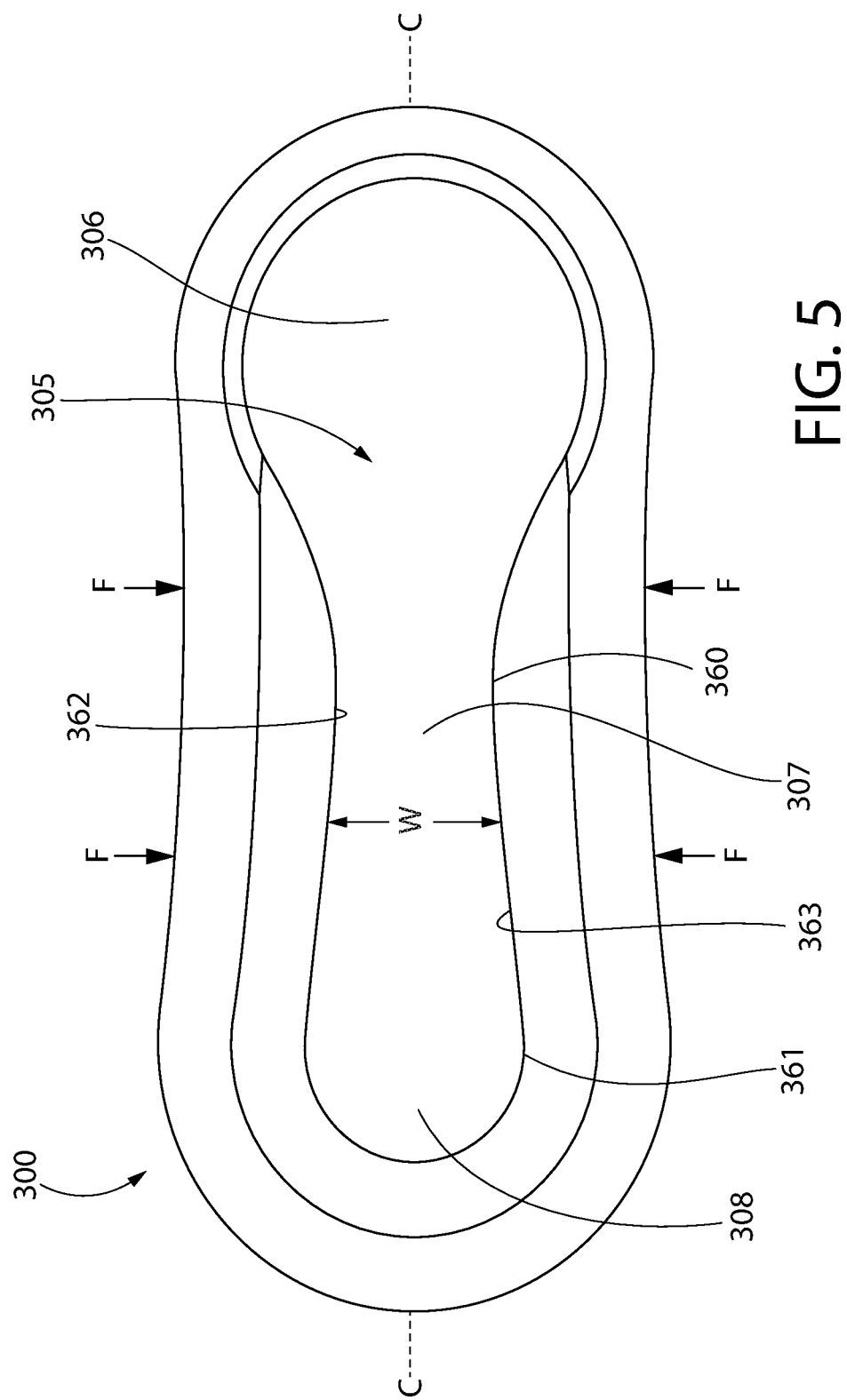
FIG. 5 is a top view of the female coupler of FIG. 4A illustrating compressive forces acting on the female coupler when it is installed in the board as shown in FIG. 1.

Referring briefly to FIG. 5, the female coupler 300 is illustrated in a compressed state. It should be appreciated that in some embodiments, when the female coupler 300 is inserted into an aperture in a board, the board may slightly compress the female coupler, which may alter the relative orientation of the first and second portions 362, 363 of the inner surface 304 of the female coupler 300. Although FIG. 5 illustrates the female coupler 300 by itself, this is done for clarity. It should be appreciated that FIG. 5 illustrates the female coupler 300 as it appears when it is coupled to one of the boards, although the compressive appearance may be slightly exaggerated in FIG. 5 for ease of understanding. A comparison between FIGS. 4C and 5 readily illustrates how the compressive forces of the board acting on the female coupler 300 adjust its structure and shape.

Specifically, the compressive forces F press on the outer surface of the female coupler 300 and cause portions of the female coupler 300 to deflect inwardly towards the cavity 305. More specifically, the compressive forces F of the board cause portions of the nesting portion 307 of the cavity 305 to deflect inwardly. As a result, when the female coupler 300 is installed in one of the boards as described in greater detail below with reference to FIGS. 6A-6D, the width W of the nesting portion 307 of the cavity 305 is no longer constant along the entirety of the nesting portion 307 of the cavity 305. Rather, the width W of the cavity 305 measured in a direction transverse to the longitudinal axis C-C increases from a first end 360 of the nesting portion 307 that is adjacent to the insertion portion 306 to a second end 361 of the nesting portion 307 that is adjacent to the locking portion 308. Thus, the width W of the nesting portion 307 of the cavity 305 is at a minimum at the first end 360 and at a maximum at the second end 361. Stated another way, the first portion 362 of the inner surface 304 located on the first side of the longitudinal axis C-C and the second portion 363 of the inner surface 304 located on the second side of the longitudinal axis C-C diverge from one another along the nesting portion 307 of the cavity 305 moving from the insertion portion 306 towards the locking portion 308.

In the exemplified embodiment, the first end 360 of the nesting portion 307 is the location within the cavity 305 where the cavity 305 has the smallest width aside from the opposing ends of the cavity 305. Specifically, the ends of the cavity 305 are rounded so clearly the width could be taken at some position along the ends where it is smaller than the width at the first end 360 of the nesting portion 307. Thus, with the opposing ends of the cavity 305 excluded, the portion of the cavity 305 with the smallest width marks the first end 360 of the nesting portion 307 in the exemplified embodiment. To be more specific, the first and second ends of the cavity 305 may each comprise approximately one-tenth of the length of the cavity 305 (with the length being measured in a direction of the longitudinal axis C-C), and the first end 360 of the nesting portion 307 may be located at the portion of the cavity 305 with the smallest width that is outside of the first and second ends. Stated another way, the nesting portion 307 of the cavity 305 may be the portion of the cavity 305 where the sidewalls 304 on opposing sides of the longitudinal axis C-C continually diverge from one another As a result, the first end 360 of the nesting portion 307 of the cavity 305 forms a sort of snap-over feature such that when the male coupler 200 is being coupled to the female coupler 300, the male coupler must be moved past the first end 360 of the nesting portion 307 with a sufficient force to overcome the interference created between the walls of the female and male couplers 200, 300. To disengage or decouple the male coupler 200 from the female couplers 300, this must occur in reverse, which makes it unlikely that the male and female couplers 200, 300 will become detached accidentally without user intention.

During assembly, the second portion 220 of the male coupler 200 is received within the insertion portion 306 of the cavity 305 of the female coupler 300. Specifically, the second portion 220 of the male coupler 200 is inserted through the opening 319 in the second end 302 of the body portion 309 of the female coupler 300. The male coupler 200 is unable to be received directly within the nesting and locking portions 307, 308 of the cavity 305 because the cross-sectional shape of the second end 202 of the male coupler 200 does not fit into the opening 319 along the nesting and locking portions 307, 308 (i.e., the cross-sectional shape of the second end 202 of the male coupler 200 does not fit into the cross-sectional shape at the open ends of the cavity 305 along the nesting and locking portions 307, 308). Rather, the only way to position the male coupler 200 within the nesting and locking portions 307, 308 of the cavity 305 is to insert the male coupler 200 into the insertion portion 306 of the cavity 305 and then slide the male coupler 200 in a direction generally perpendicular to the axes A-A, B-B until it enters into the nesting and locking portions 307, 308 of the cavity 305.

Once the male coupler 200 is located within the nesting portion 307 of the cavity 305, the inner surface 304 of the female coupler 300 (i.e., the protuberance 350) engages/interacts with the outer surface of the second portion 220 of the male coupler 200 to couple the male and female couplers 200, 300 together. When the second portion 220 of the male coupler 200 is located within the nesting portion 307, the male coupler 200 cannot be moved axially (i.e., in the direction of the axes A-A, B-B) relative to the female coupler 300. This occurs due to the shape of the outer surface of the second portion 220 of the male coupler 200 and the shape of the inner surface 304 (i.e., wall) of the female coupler 300 being corresponding shapes. Rather, to disengage the male coupler 200 from the female coupler 300, the second portion 220 of the male coupler 200 must first be slid back to the insertion portion 306 of the cavity 305, and then the male coupler 200 can be moved axially relative to the female coupler 300 to detach the male coupler 200 from the female coupler 300. This process of coupling the male coupler 200 to the female coupler 300 and the resulting structure is best illustrated in FIGS. 6A-8B, described below.

Figure 4G:
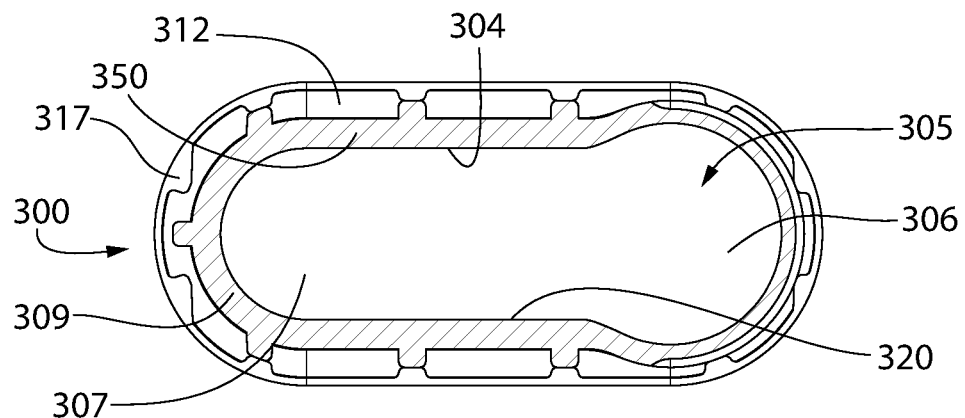
FIG. 4G is a cross-sectional view taken along line IVG-IVG of FIG. 4D.
Figure 4H:
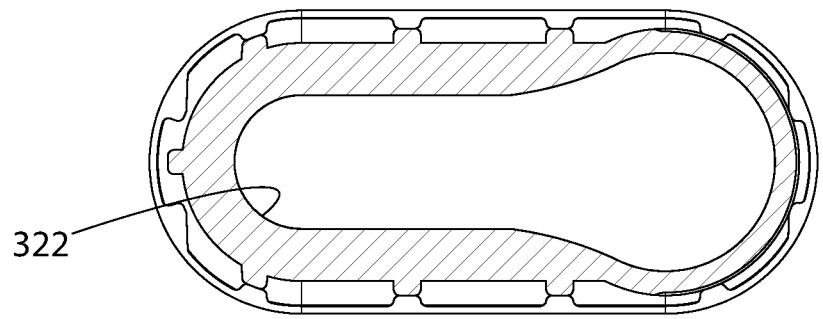
FIG. 4H is a cross-sectional view taken along line IVH-IVH of FIG. 4D.
Figure 4I:
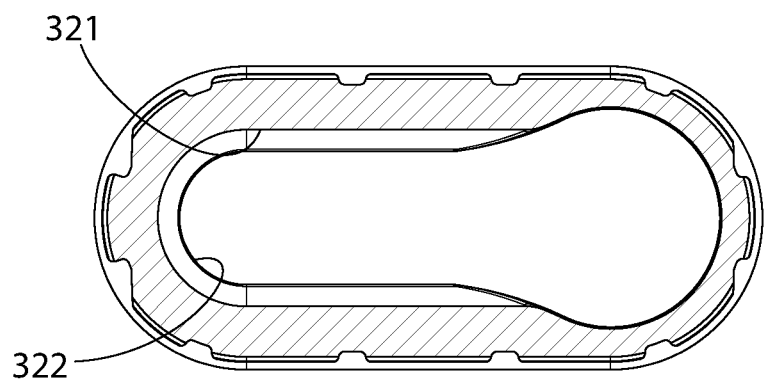
FIG. 4I is a cross-sectional view taken along line IVI-IVI of FIG. 4D.

Referring briefly to FIGS. 4G-4I, cross-sectional views of the female coupler 300 are provided at different axial locations therealong to show the differences in structure and shape of the inner surface 304 at different positions of the female coupler 300.

Figure 6A:
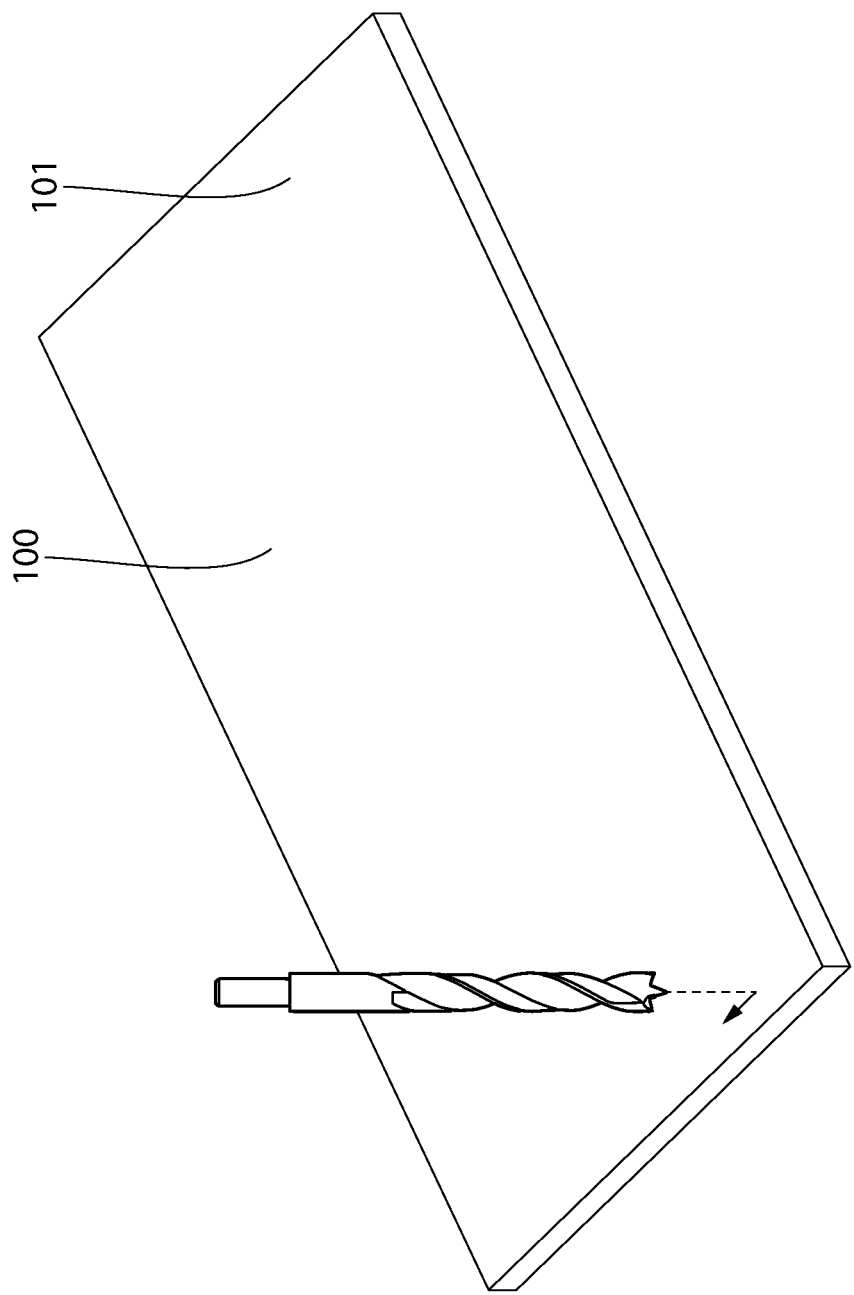
FIGS. 6A-6H illustrate the process of coupling the male and female couplers to the furniture part, in accordance with an embodiment of the present invention.
Figure 6B:
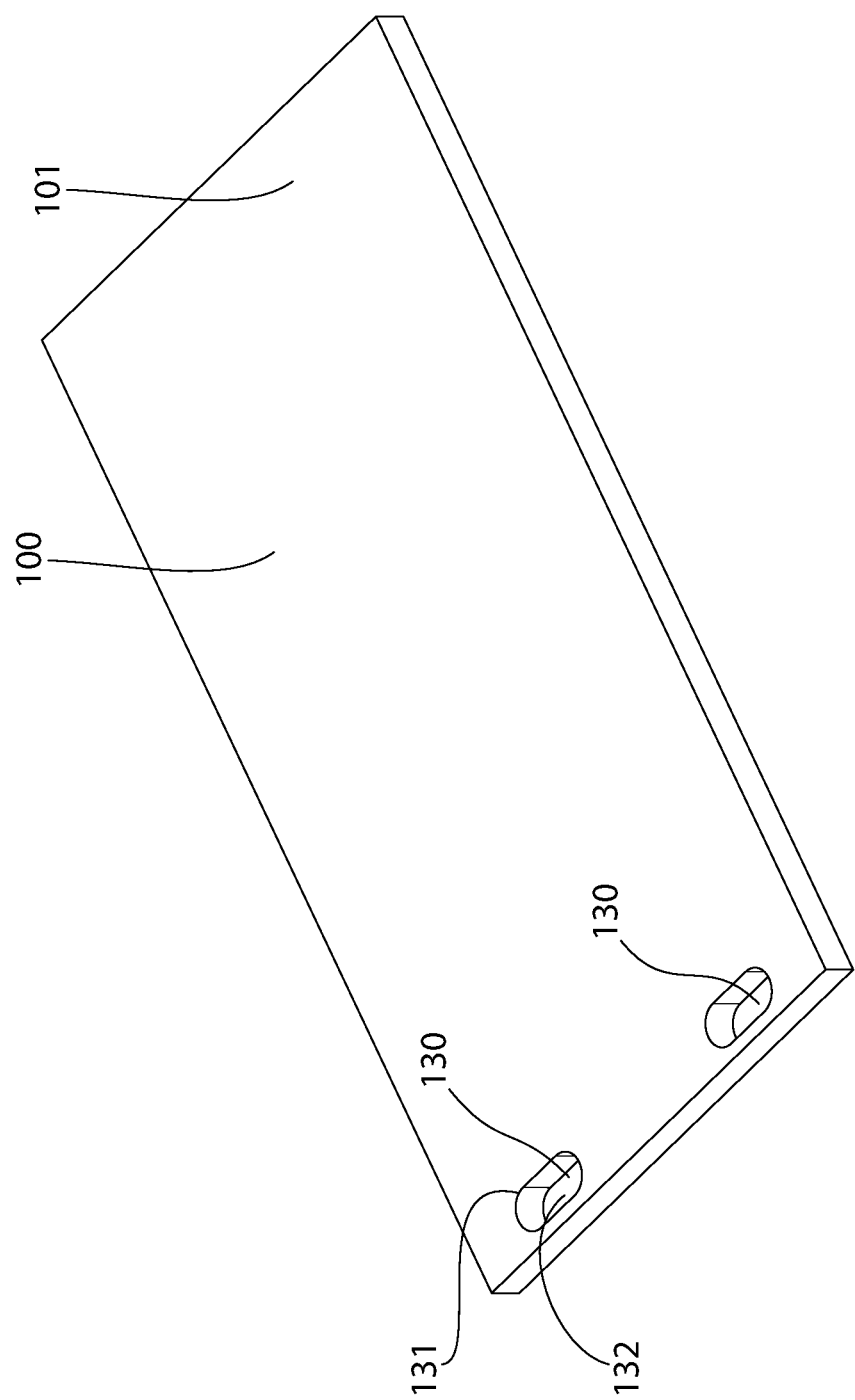

Referring to FIGS. 6A-6H, the process of attaching the male and female couplers 200, 300 to the board 100 will be described. It should be appreciated that this process is generally completed by the manufacturer or factory so that this process is not something that a consumer or end user will likely need to do. First, as shown in FIGS. 6A and 6B, one or more first apertures 130 are formed into the board 100 for receiving the female couplers 300. The first apertures 130 are preferably blind holes, meaning they do not extend through both of the front and rear surfaces 101, 102 of the board 100, but rather they have an opening 131 at one of the front and rear surfaces 101, 102 and a floor 132 adjacent to the other of the front and rear surfaces 101, 102. However, it is possible in other embodiments for the first apertures 130 to extend entirely through the board 100 without affecting the function described herein. The first apertures 130 may be formed using a drill bit, router, or the like. In the exemplified embodiment, the first apertures 130 are oval in shape to match the shape of the female couplers 300. The first apertures 130 may have a different shape but it should correspond to the shape of the female couplers 300 to ensure a tight/snug fit between the female couplers 300 and the board 100. In some embodiments, the first apertures 130 may be slightly smaller than the female couplers 300 so that the board 100 applies a slight inward compressive force/pressure on the female couplers 300 as described herein above, although this is not required in all embodiments.

Figure 6C:
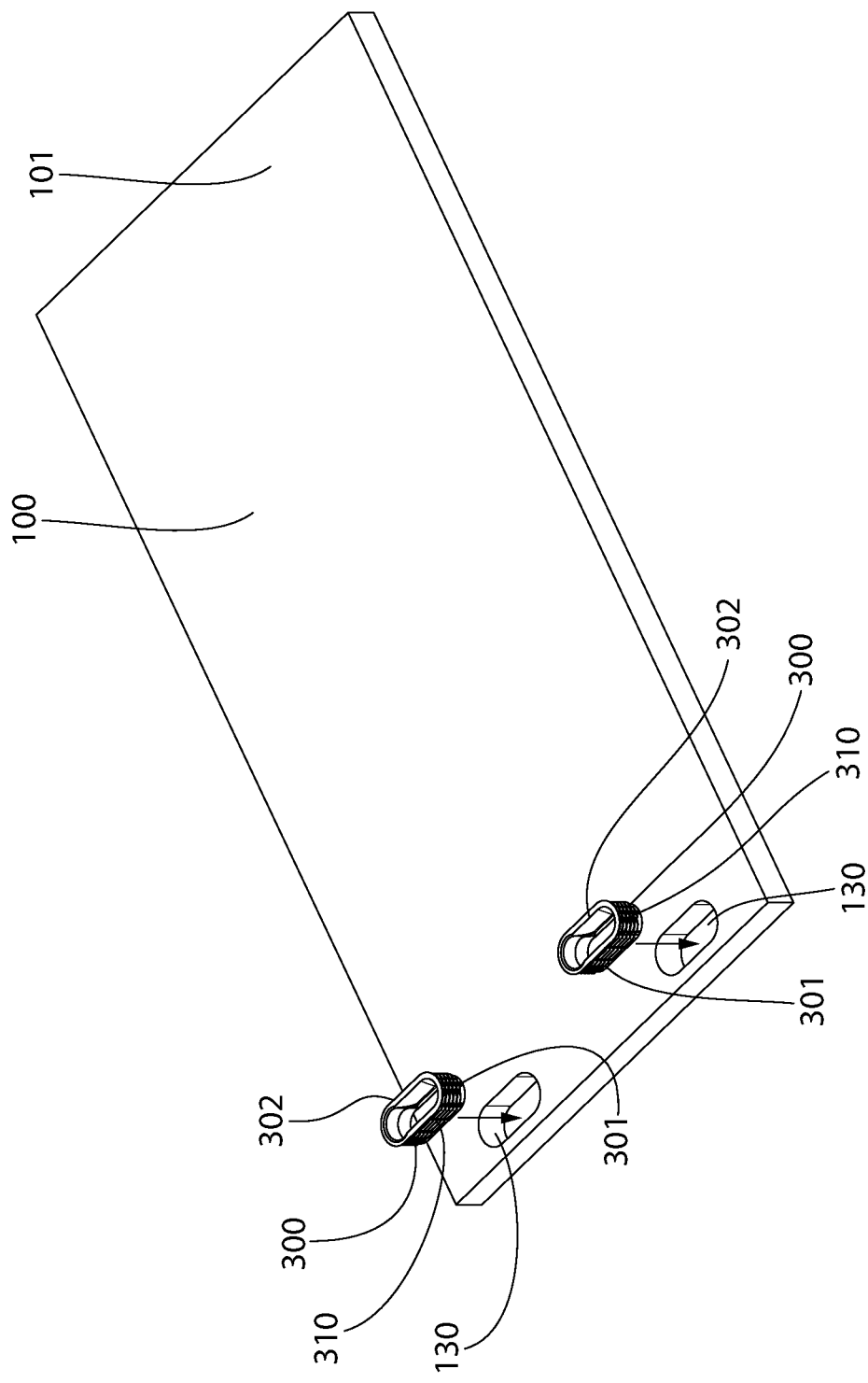
Figure 6D:
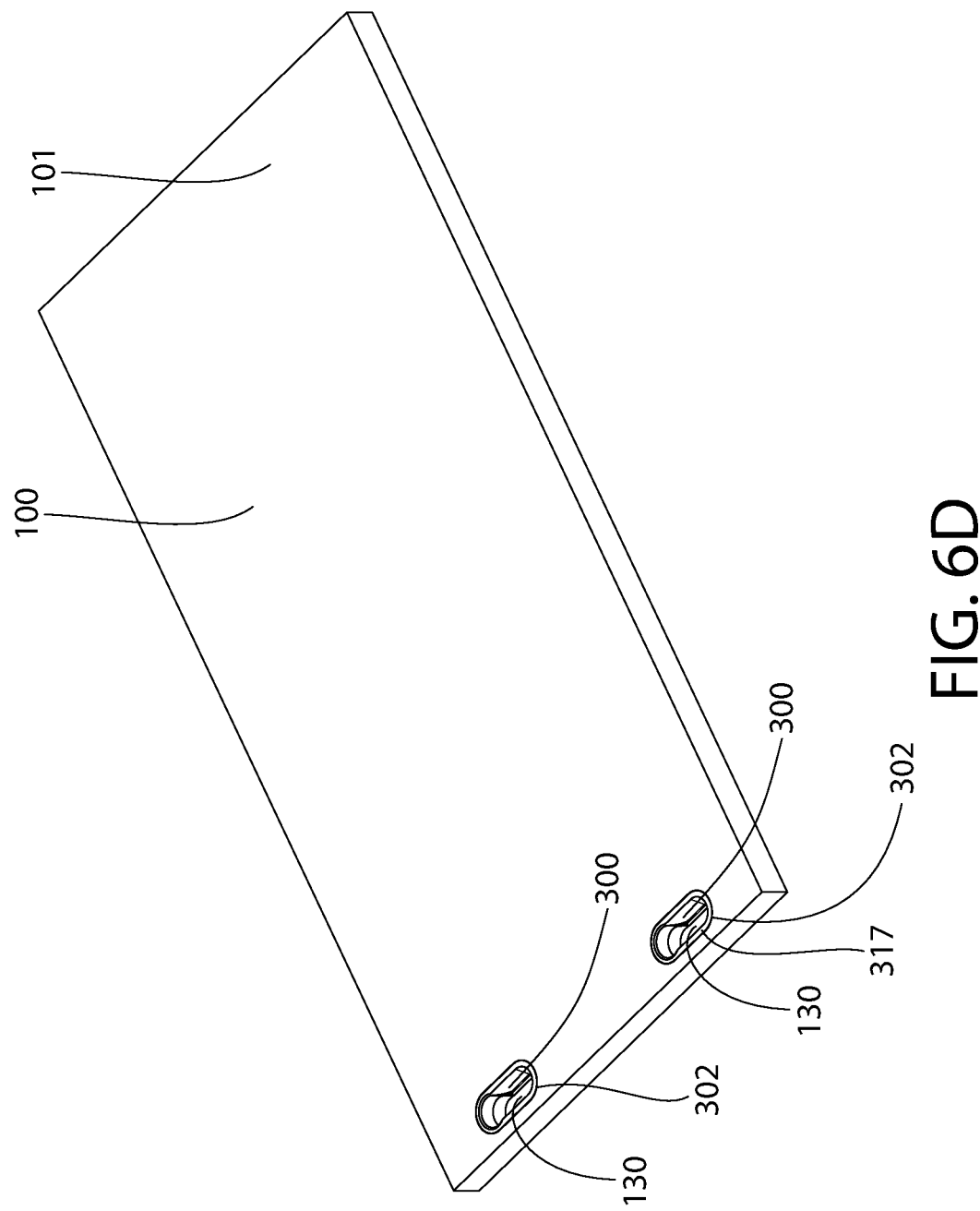

Next, referring to FIGS. 6C and 6D, the female couplers 300 are inserted into the first apertures 130 formed in the board 100. The female couplers 300 are positioned with the first ends 301 facing the front surface 101 of the board 100 and then each of the female couplers 300 is moved towards and into one of the first apertures 130. Once the female couplers 300 are fully positioned in the first apertures 100, the second ends 302 of the female couplers 300 are flush with the front surface 101 of the board 100. Specifically, the apertures 130 may include a recessed ledge on which the flanges 317 of the female couplers 300 nest so that the flanges 317 are flush with the front surface 101 (or other surface that the apertures 130 may be formed into) of the board 100. Of course, the second ends 302 of the female couplers 300 could be recessed relative to the front surface 101 of the board 100 in other embodiments, but the second ends 302 of the female couplers 300 should not protrude from the front surface 101 of the board 100. The barbs 310 of the female couplers 300 prevent the female couplers 300 from being detached from the board 100 or otherwise being removed from the first apertures 130. Specifically, the barbs 310 are angled in such a manner that they do not prevent insertion of the female couplers 300 into the apertures 130, but they make it difficult or impossible to remove the female couplers 300 therefrom without damaging the board 100. An assembler may need to use a mallet, hammer, or other tool to assist in inserting the female couplers 300 into the first apertures 130.

As noted above, the apertures 130 may be sized slightly smaller than the external diameter or width of the female couplers 300. As a result, the sidewall defining the apertures 130 may apply pressure onto the exterior of the female couplers 300, thereby causing the female couplers 300 to compress. This may decrease the size of the cavity 305 to create a tighter fit between the male and female couplers 200, 300.

Figure 6E:
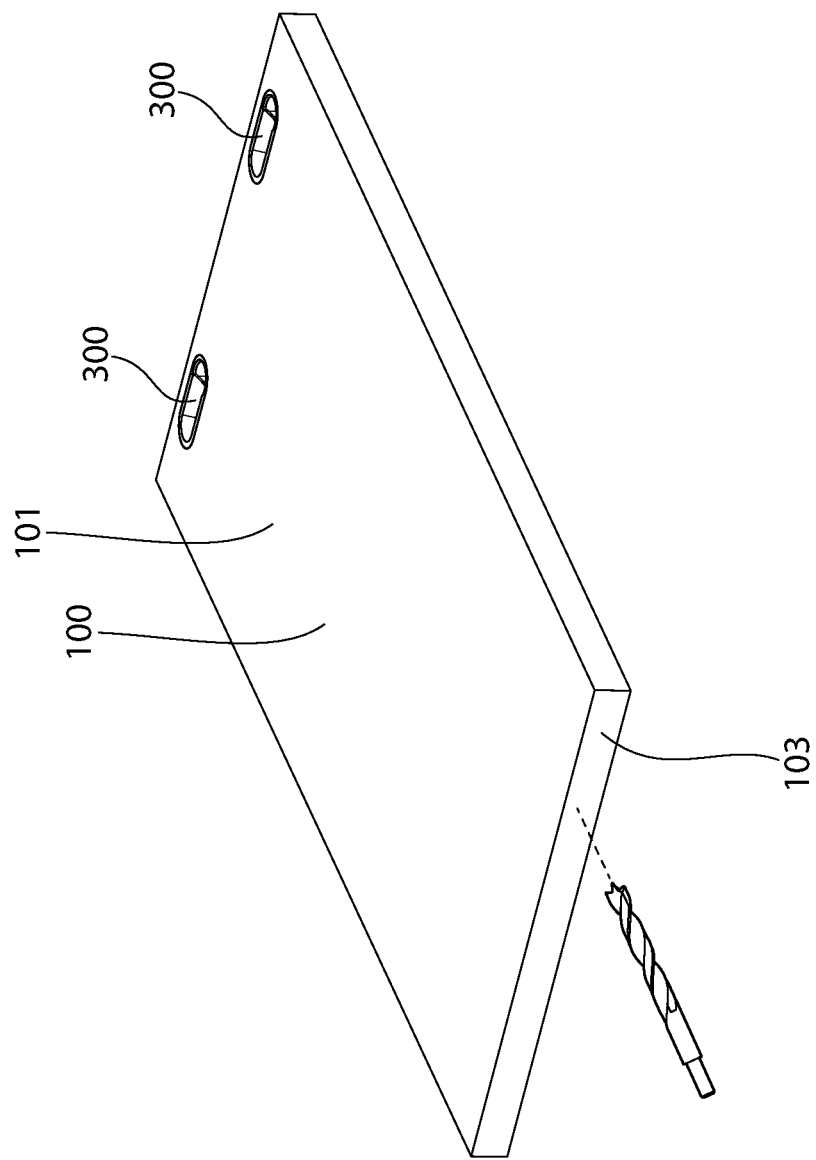
Figure 6F:
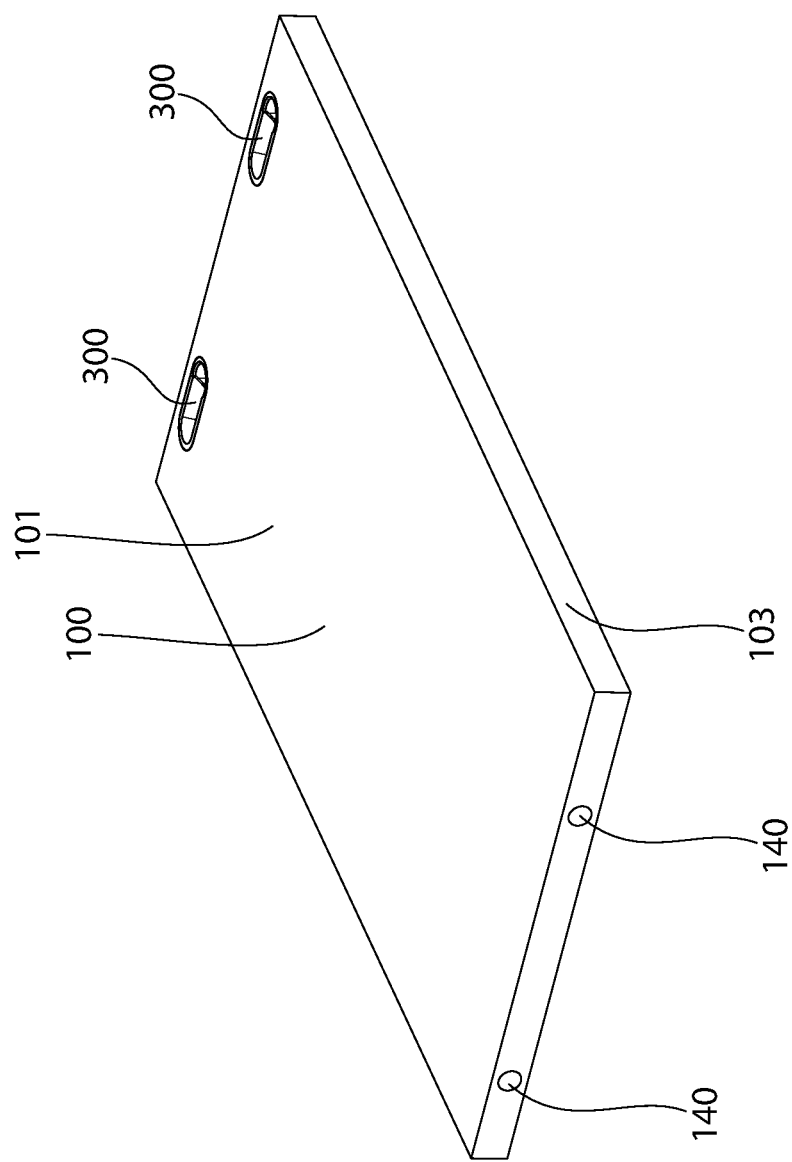

Next, referring to FIGS. 6E and 6F, second apertures 140 are formed into a portion of the edge 103 of the board 100. This can be done using a drill bit, a router, or the like. The holes 140 are blind holes in that they have a floor rather than extending entirely through the board 100. In the exemplified embodiment, the second apertures 140 are round/circular or cylindrical in shape to match the shape of the second portions 220 of the male couplers 200.

Figure 6G:
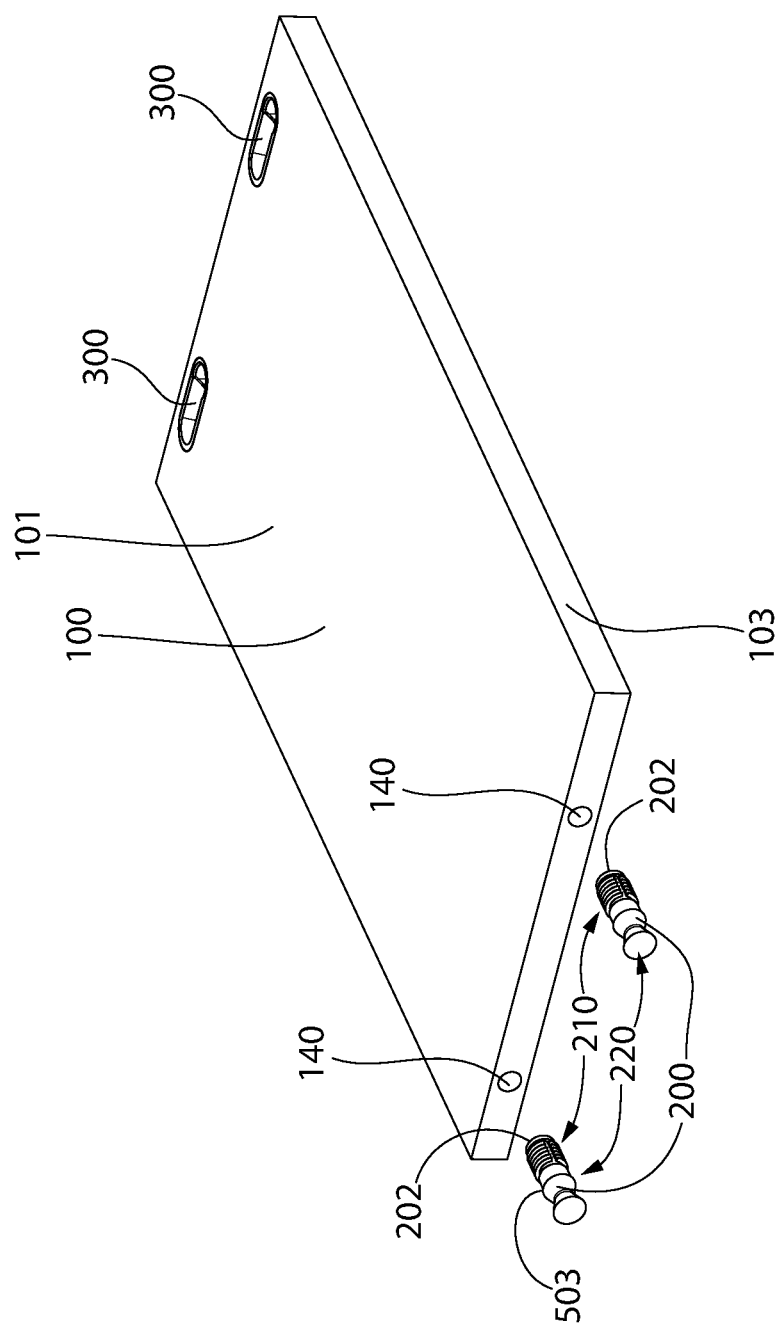
Figure 6H:
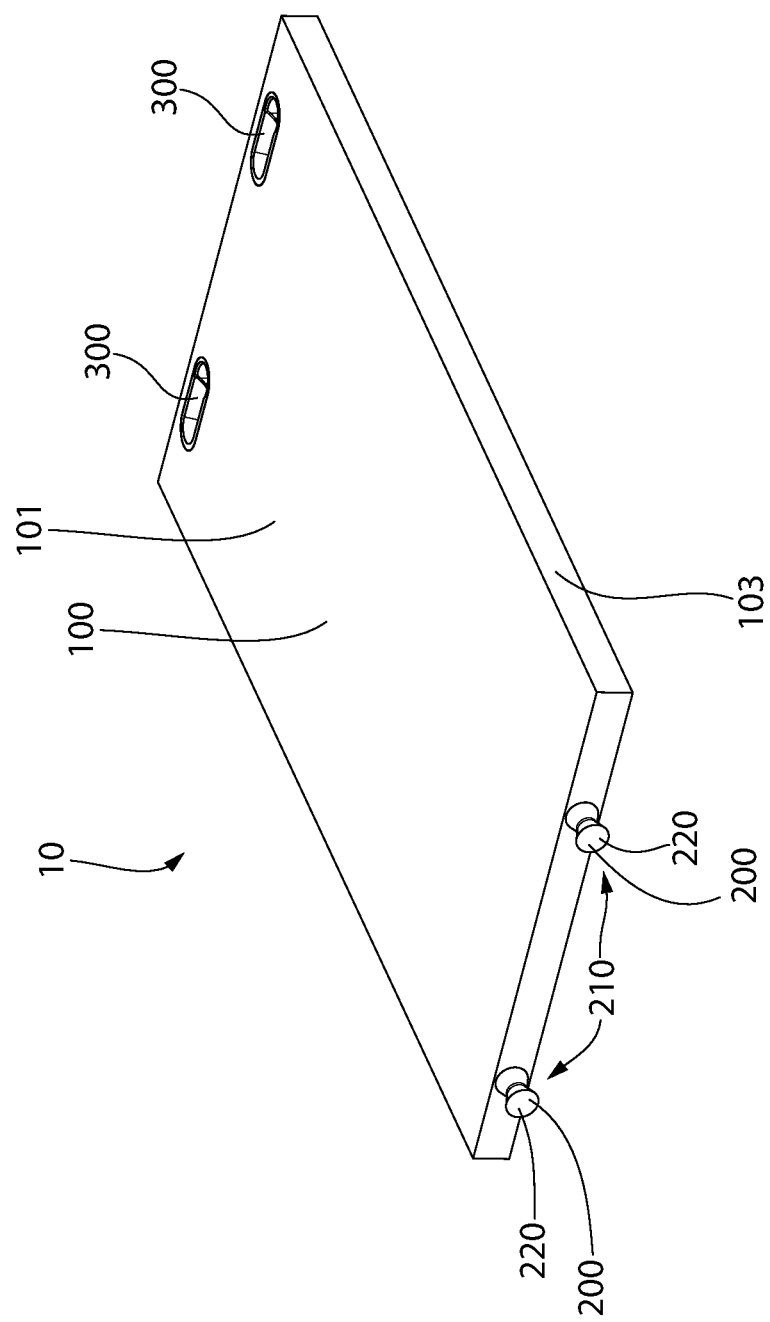

Next, referring to FIGS. 6G and 6H, the process of coupling the male couplers 200 to the board 100 within the second apertures 140 is illustrated. The second ends 202 of the male couplers 200 are aligned with the second apertures 140 and then the male couplers 200 are inserted axially (i.e., in the direction of its axis A-A) into the second apertures 140 until the shoulders 203 of the male couplers 200 contact the board 100. The barbs 212 bend and flex to enable the male couplers 200 to be inserted into the second apertures 140, but the barbs 212 substantially prevent the male couplers 200 from being removed from the second apertures 140 and detached from the board 100 after attachment thereto. An assembler may need to use a tool to assist in inserting the male and female couplers 200, 300 couplers 300) into their respective openings 130, 140. For example, an assembler may use a hammer, a mallet, or the like in this step of the assembly process. Alternatively, the male and female couplers 200, 300 may be coupled to the board 100 by a machine.

As shown in FIG. 6H, when the male couplers 200 are coupled to the board 100, the first portions 210 (not visible in FIG. 6H) of the male couplers 200 are located entirely within the second apertures 140 and the second portions 220 of the male couplers 200 protrude from the edge 103 of the board 100 (or whichever surface of the board the male couplers 200 are attached to). Thus, the second portions 220 of the male couplers 200 are available and ready to be inserted into the female couplers 300 that are coupled to another board 100. FIG. 6H illustrates a completed furniture part 10 that includes the board 100, two of the male couplers 200, and two of the female couplers 300 (although all are not needed to make a completed furniture part 10 in all embodiments as described herein above).

Although in the exemplified embodiment the female couplers 300 are coupled to the board 100 and then the male couplers 200 are coupled to the board 100, the order in which this occurs during the manufacturing process is not limiting of the present invention. In some embodiments, the first and second apertures 130, 140 may all be formed into the board 100, and then the male and female couplers 200, 300 may be coupled to the board 100. In other embodiments, the male couplers 200 may be coupled to the board 100 before the female couplers 300 are coupled to the board 100. The order in which the male and female couplers 200, 300 are coupled to the board 100 makes no difference in the functionality of the device/system. In still other embodiments, the furniture part 10 may comprise the board 100 and one or more of the female couplers 300 but none of the male couplers 200. In another embodiment, the furniture part may comprise the board 100 and one or more of the male couplers 200 but none of the female couplers 300. Thus, depending on the needs of a particular furniture part for the assembly of an article of furniture, the number and types of the couplers (i.e., male and female couplers 200, 300) may be modified.

Figure 7A:
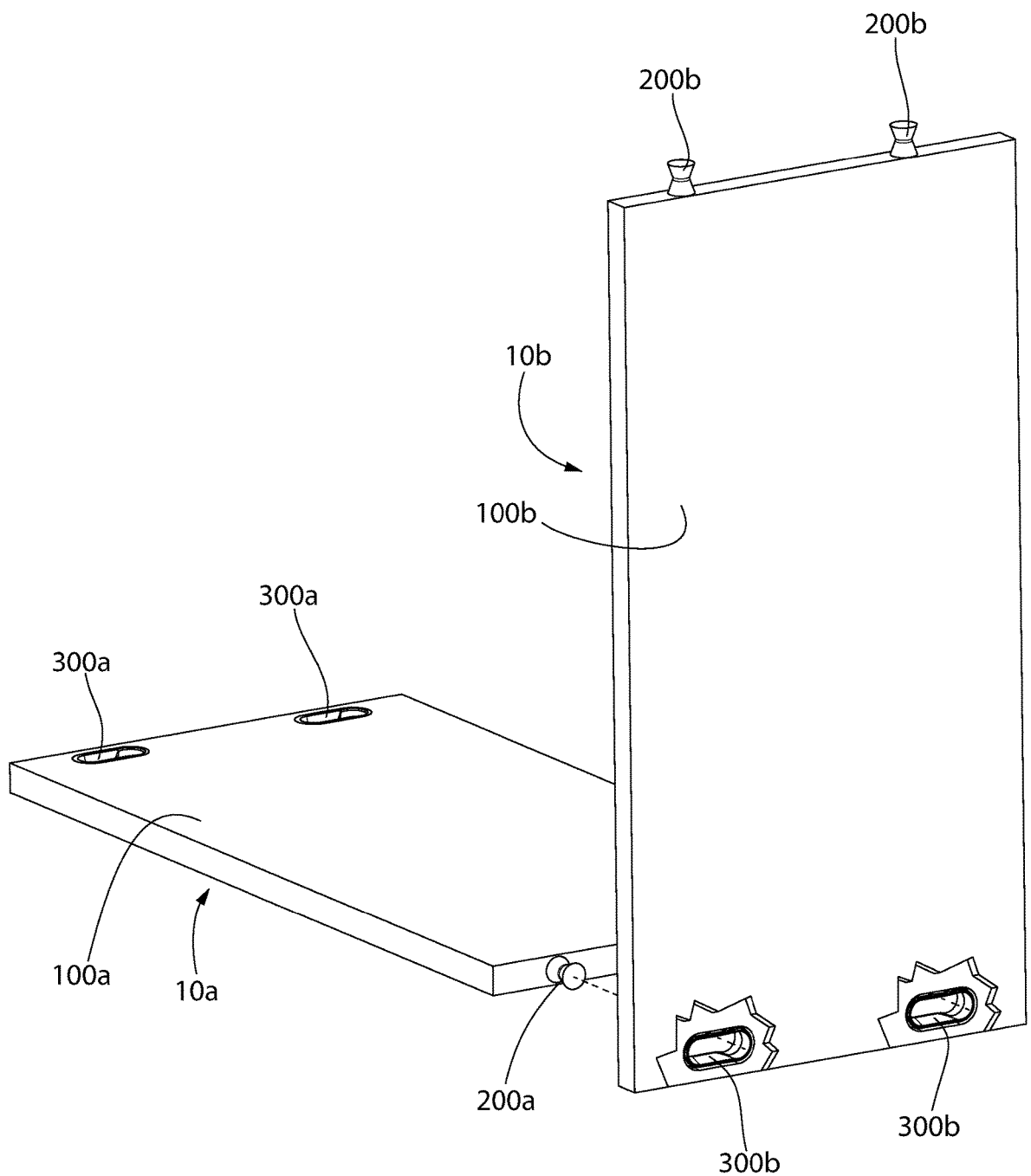
FIGS. 7A-9B illustrate the process of coupling two distinct furniture parts together via mating between the male and female couplers attached thereto with FIGS. 7B, 8B, and 9B being schematic cross-sectional views of FIGS. 7A, 8A, and 9A, respectively.
Figure 7B:
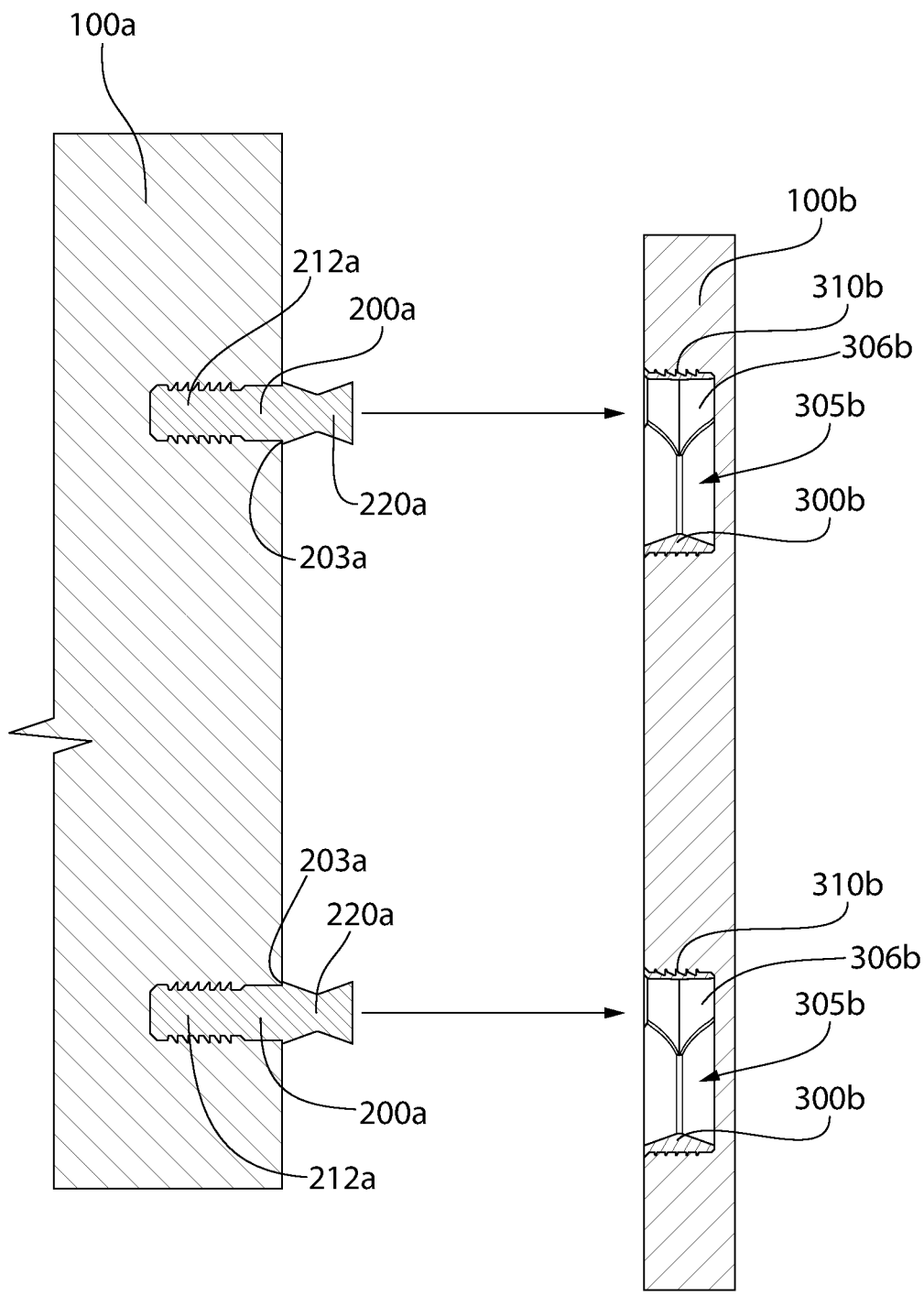

FIGS. 7A and 7B illustrate a first furniture part 10a and a second furniture part 10b aligned in preparation for coupling those two furniture parts 10a, 10b together. The first furniture part 10a comprises a first board 100a, two of the male couplers 200a, and two of the female couplers 300a. The second furniture part 10b comprises a second board 100b, two of the male couplers 200b, and two of the female couplers 300b. Of course, the first furniture part 10a could omit the female couplers 300a, 300b and the second furniture part 10b could omit the male couplers 200b, 200b in some embodiments.

In this embodiment, the male couplers 200a of the first furniture part 10a mate, interact, or engage with the female couplers 300b of the second furniture part 10b to couple the first and second furniture parts 10a, 10b together. FIGS. 7A and 7B illustrate the male and female couplers 200a, 300b aligned in preparation for being coupled together. The second portions 220a of the male couplers 200a protrude from the board 100a and are aligned with the cavities 305b (specifically, the insertion portions 306b of the cavities 305b) of the female couplers 300b that are coupled to the board 100b. As best seen in FIG. 7B, the barbs 212a, 310b ensure that the male and female couplers 200a, 300b remain coupled to the boards 100a, 100b. Furthermore, the shoulder 203a of the male couplers 200a prevents the second portions 220a of the male couplers 200a from being inserted into the apertures in the board 100a.

Figure 8A:
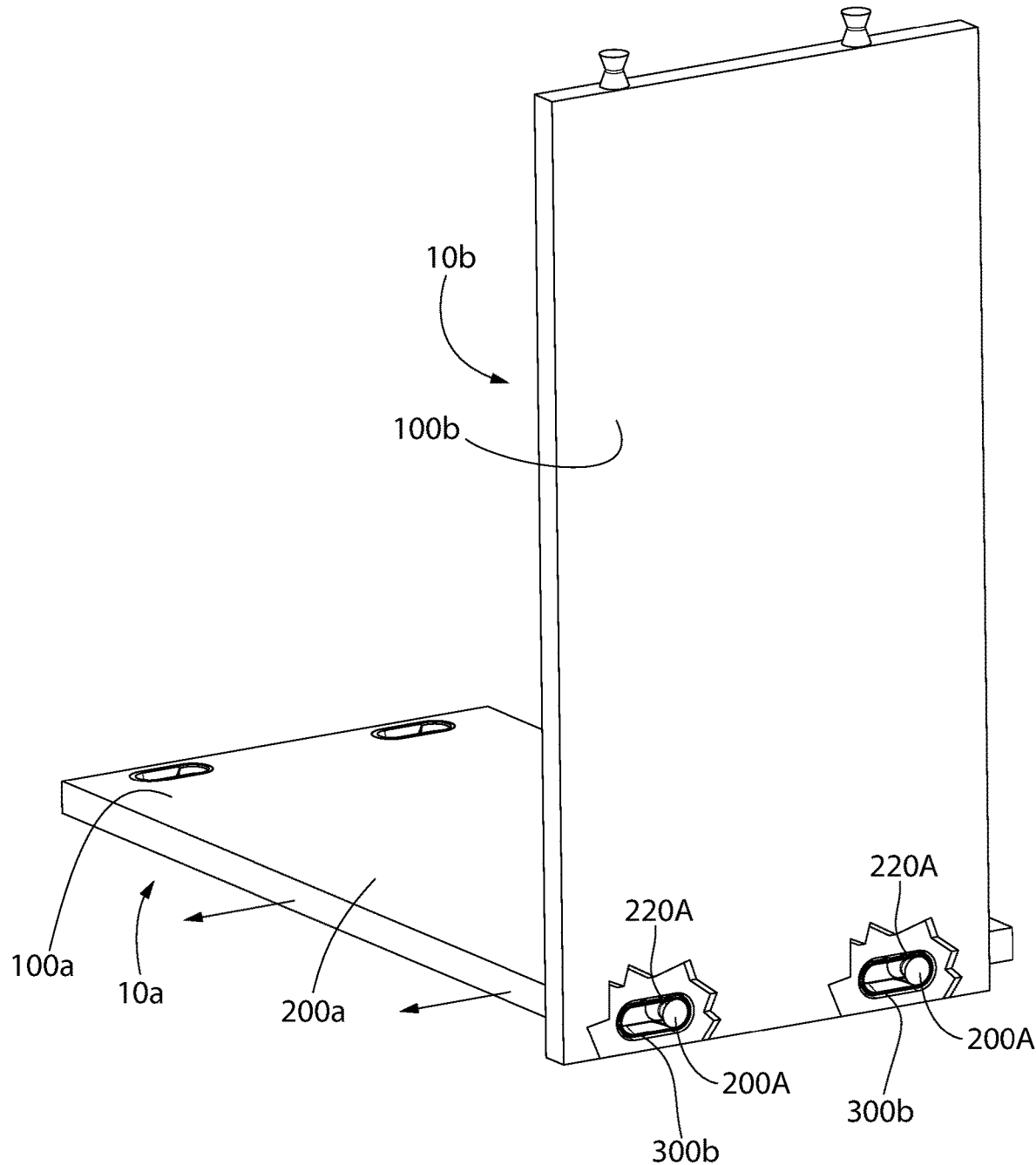
Figure 8B:
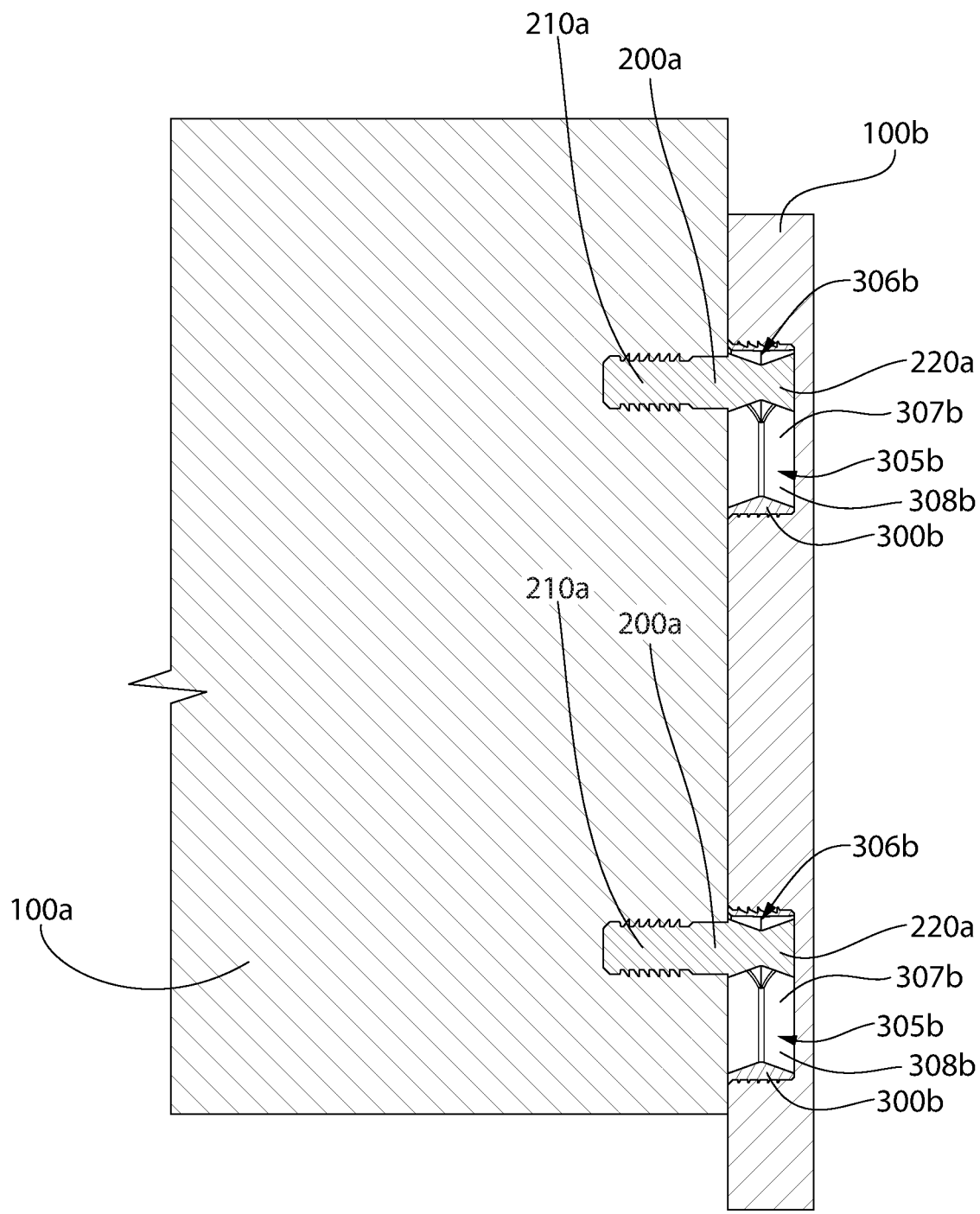

Referring to FIGS. 8A and 8B, the first and second furniture parts 10a, 10b are moved towards one another until the second portions 220a of the male couplers 200a that are coupled to the first board 100a enter into the insertion portions 306 of the cavities 305b of the female couplers 300b that are coupled to the second board 100b. At this point, the male and female couplers 200a, 300b are not locked together and the first board 100a can be readily moved away from the second board 100b. It is not until the male couplers 200a slide into the nesting portion 307b of the female couplers 300b that the male and female couplers 200a, 300b, and hence also the first and second furniture parts 10a, 10b, become locked to one another. This is because the cross-sectional shape of the insertion portion 306b of the cavities 305b is different than the cross-sectional shape of the nesting portion 307b of the cavities 305b. Specifically, the nesting portion 307b has a cross-sectional shape that corresponds with the cross-sectional shape of the second portion 220a of the male couplers 200a, but the insertion portion 306b has no such cross-sectional shape.

Figure 9A:
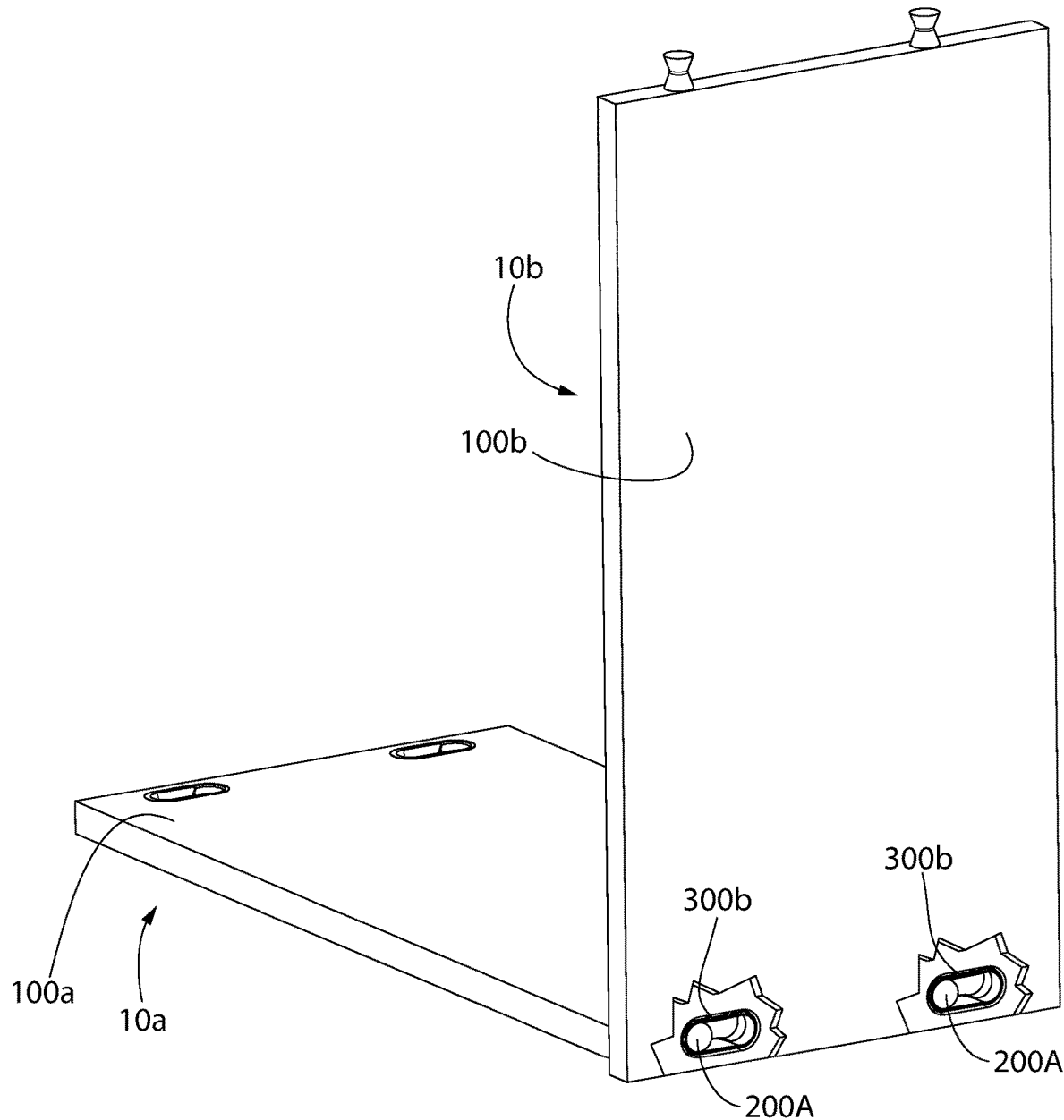
Figure 9B:
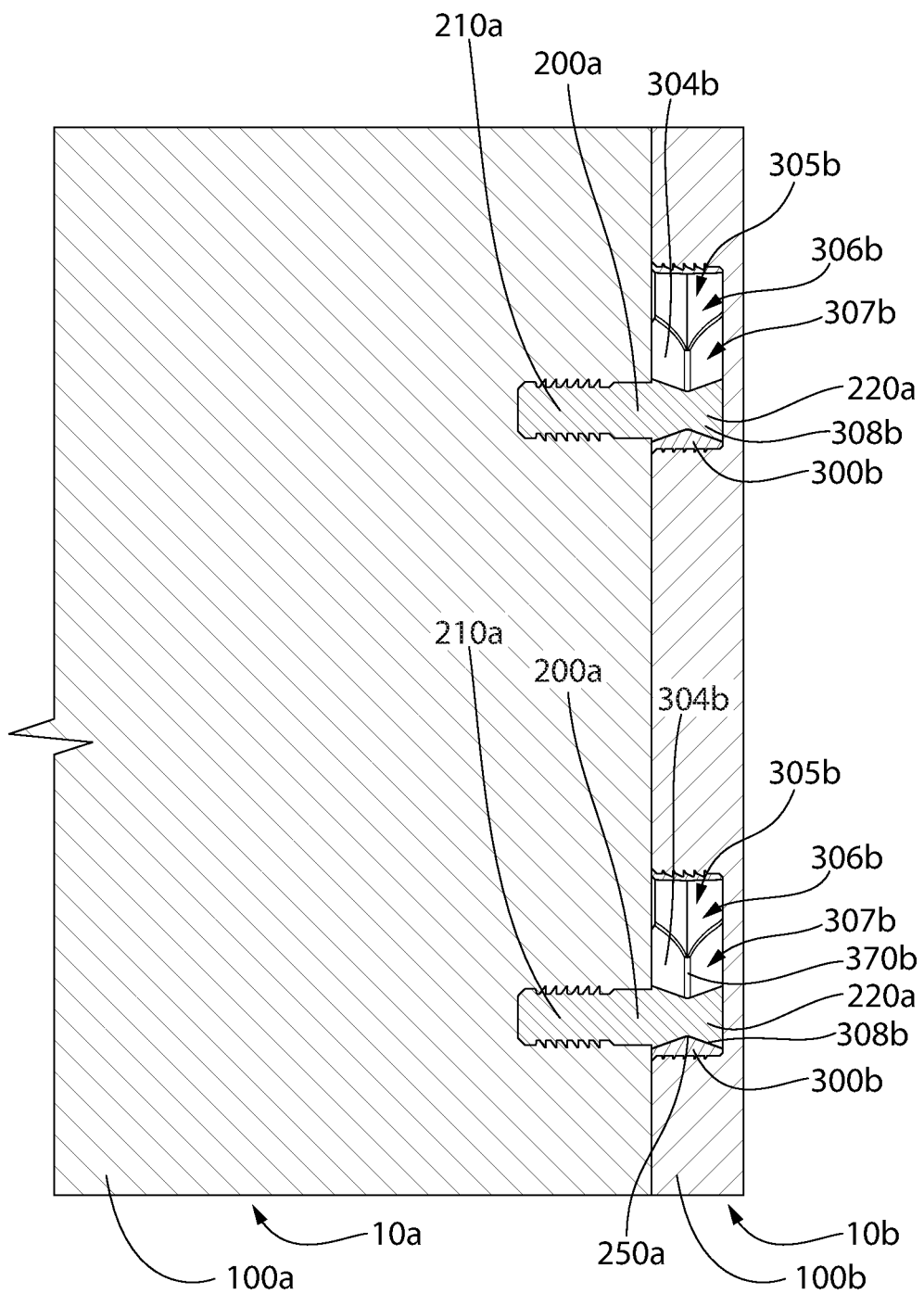
Figure 10A:
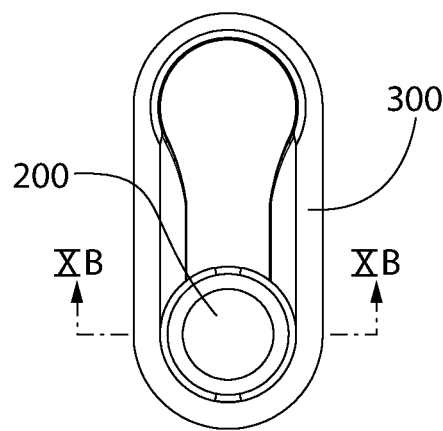
FIG. 10A is a top view illustrating the male coupler attached to the female coupler.
Figure 10B:
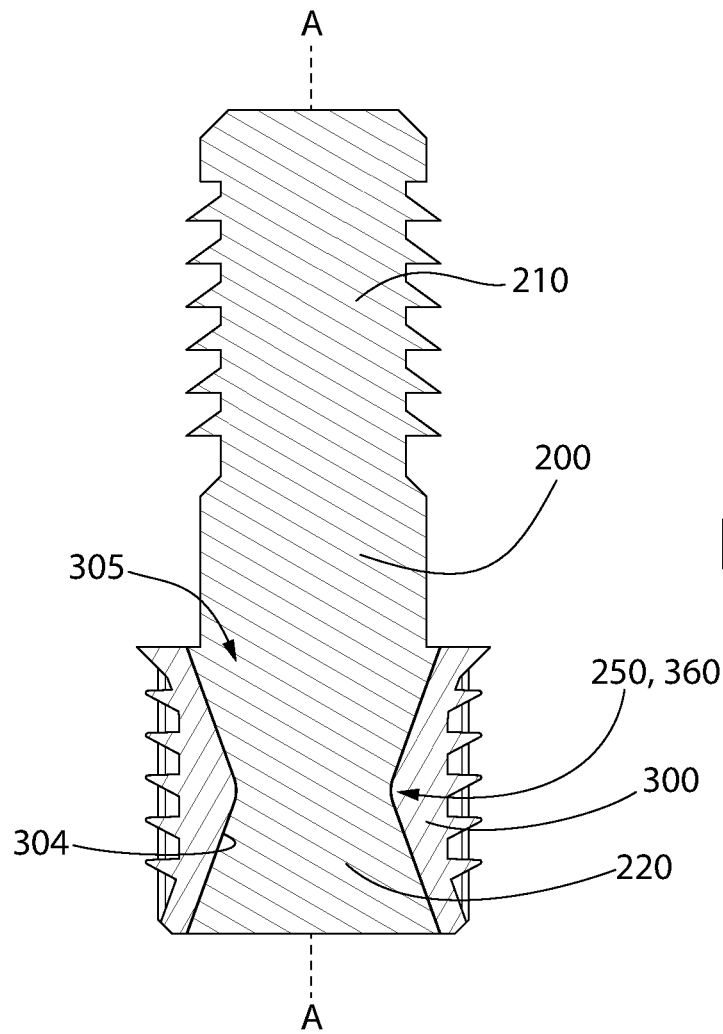
FIG. 10B is a cross-sectional view taken along line XB-XB of FIG. 10A.
Figure 11B:
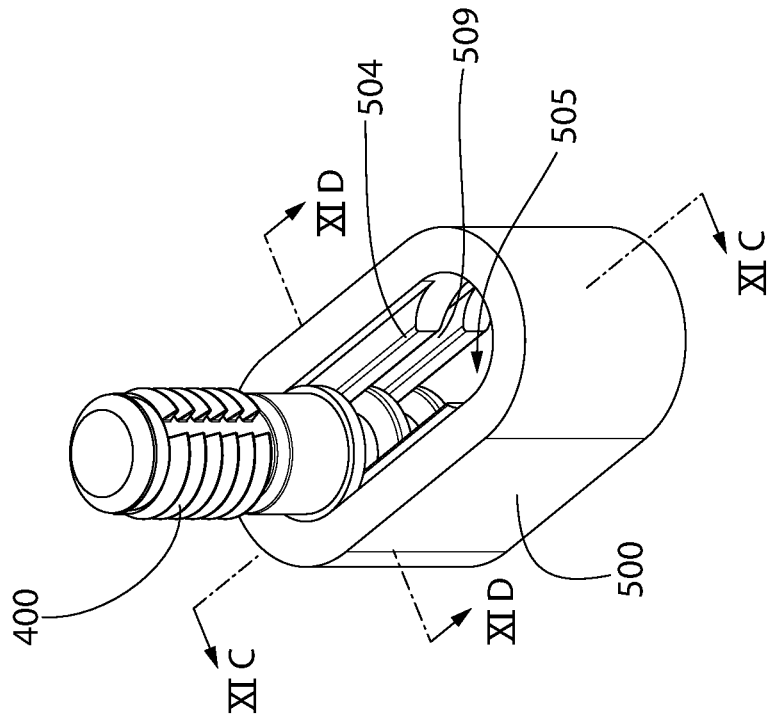
FIGS. 11A and 11B illustrate male and female couplers in a detached and attached state, respectively, in accordance with a first alternative embodiment of the present invention.
Figure 11A:
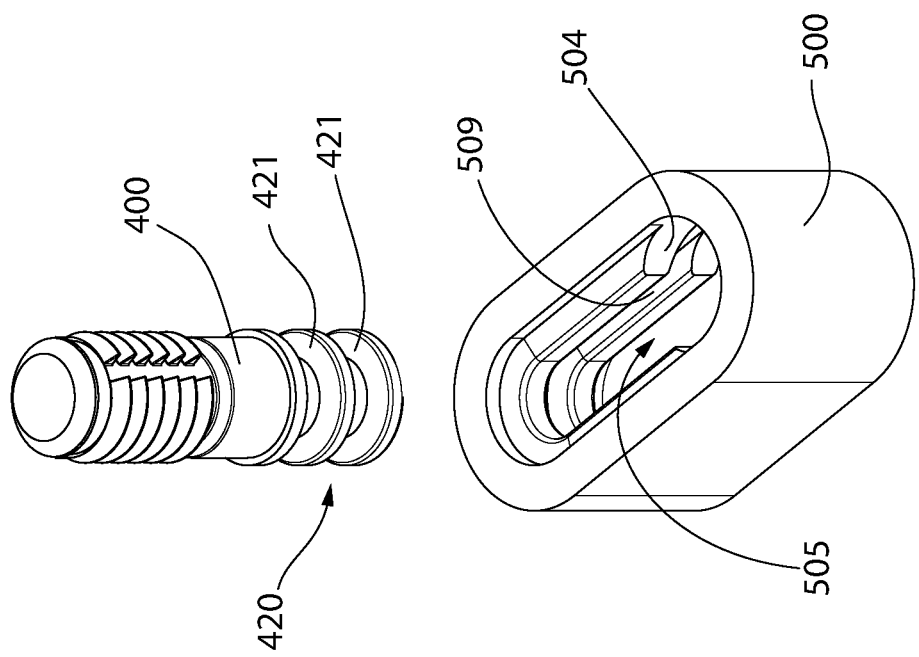
Figure 11D:
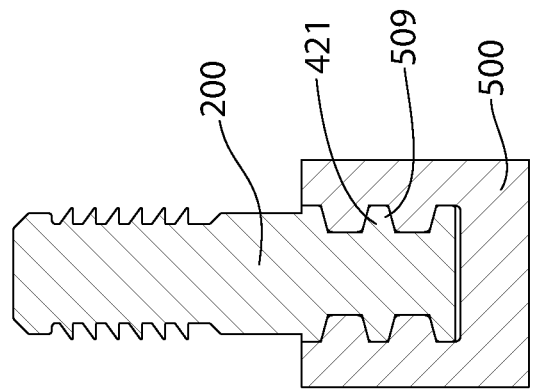
FIGS. 11C and 11D are cross-sectional views taken along lines XIC-XIC and XID-XID in FIG. 11B, respectively.
Figure 11C:
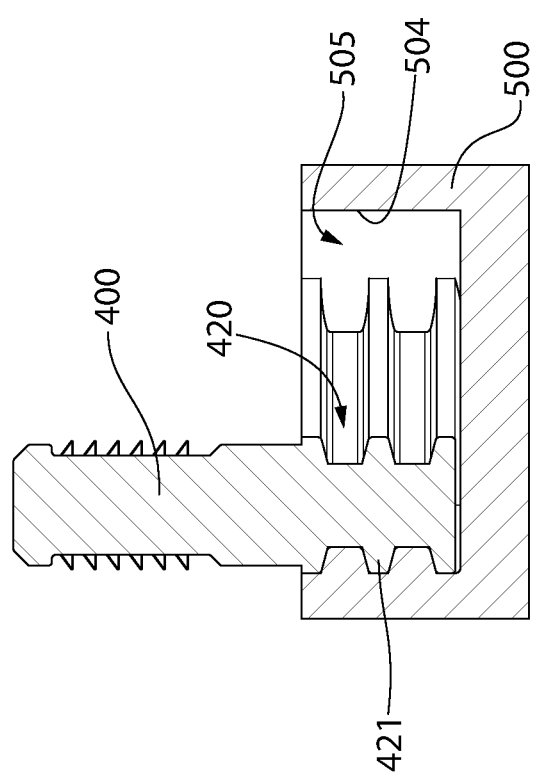
Figure 12B:
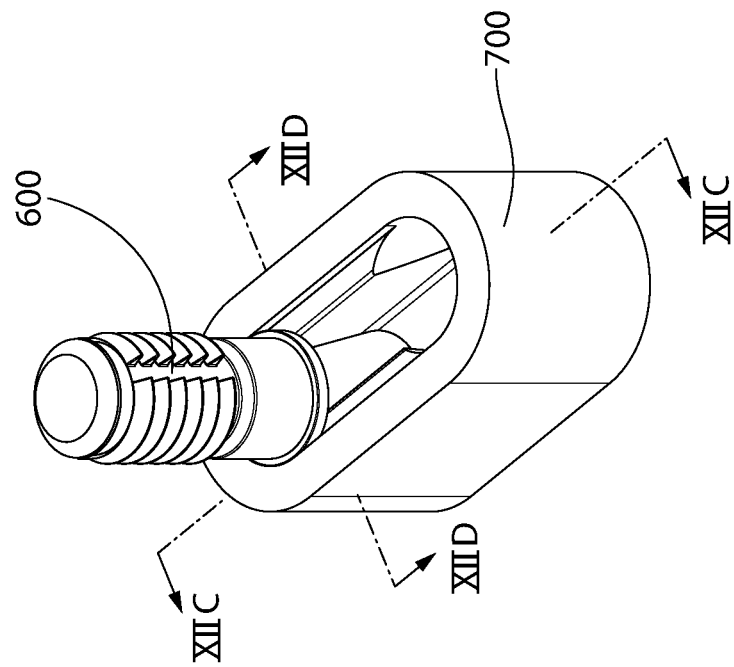
FIGS. 12A and 12B illustrate male and female couplers in a detached and attached state, respectively, accordance with a second alternative embodiment of the present invention.
Figure 12A:
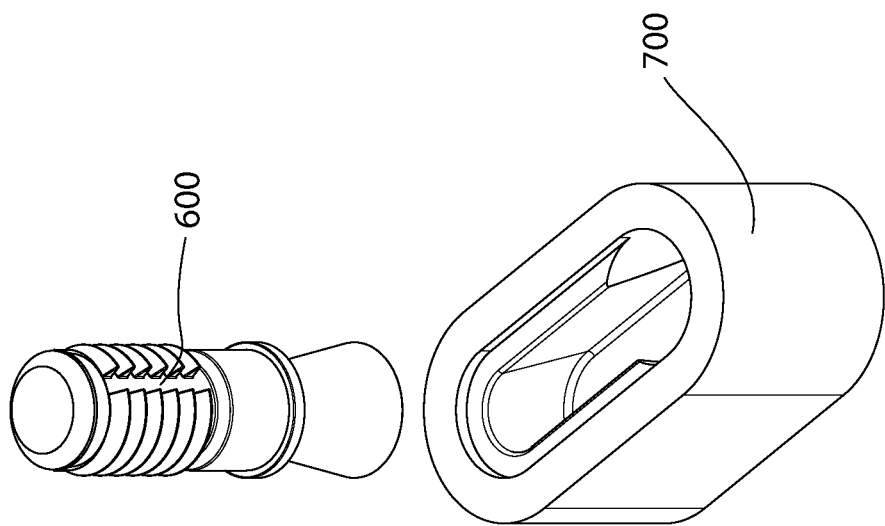
Figure 12C:
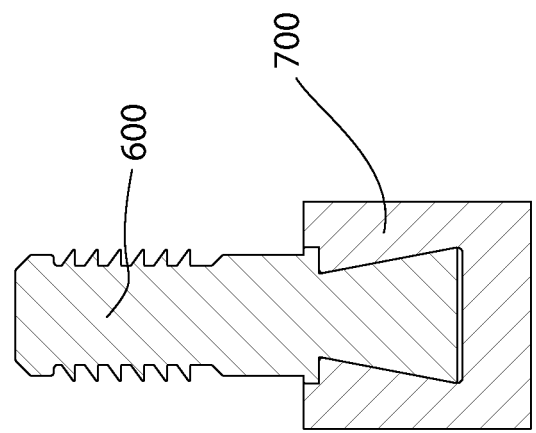
FIGS. 12C and 12D are cross-sectional views taken along lines XIIC-XIIC and XIID-XIID in FIG. 10B, respectively.
Figure 12D:
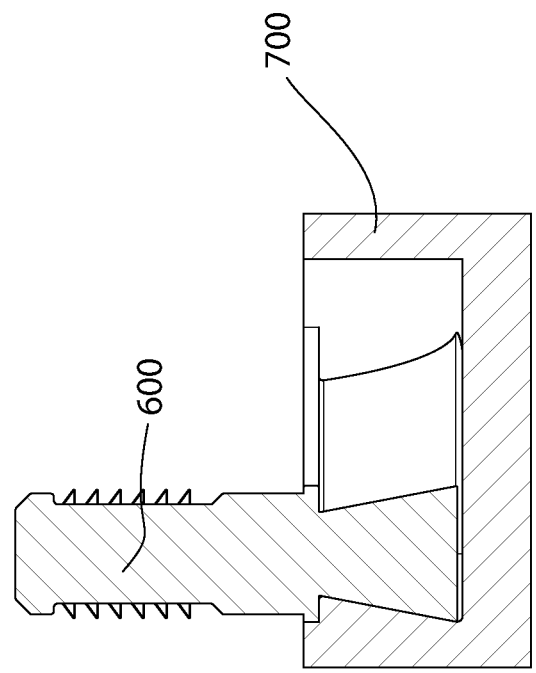

Next, referring to FIGS. 9A and 9B, the first furniture part 10a is slid relative to the second furniture part 10b, thereby sliding the male couplers 200a of the first furniture part 10a from the insertion portions 306b to the nesting portions 307b to the locking portions 308b of the cavities 305b of the female couplers 300b of the second furniture part 10b. As the male couplers 200a slide from the insertion portions 306b of the cavities 305b to the nesting portions 307b of the cavities 305b, the inner surface 304b of the female couplers 300b (i.e., the second engagement feature 370b) mates/interacts/engages the outer surface of the second portions 220a of the male couplers 200a (i.e., the first engagement feature 250a). This interaction between the inner surface 304b of the female couplers 300b and the outer surface of the second portions 220a of the male couplers 200a (which is also illustrated in FIGS. 10A and 10B) prevents the male couplers 200a from being able to move axially (in the direction of the axis A-A of the male couplers 200a).

Thus, when the second portions 220a of the male couplers 200a are located within the nesting and locking portions 307b, 308b of the cavities 305b of the female couplers 300b, the male and female couplers 200a, 300b are effectively locked together (in the axial direction of the male couplers 200a), which in turn locks the first and second furniture parts 10a, 10b together. As noted above, in order to detach the male couplers 200a from the female couplers 300b, the male couplers 200a must first be slid within the cavities 305b back into the nesting regions 306b and then the male couplers 200a can be moved axially out of the cavities 305. When the male and female couplers 200a, 300b are coupled together, this couples the first and second boards 100a, 100b together. When the first and second boards 100a, 100b are coupled together, they form a furniture assembly or a portion of an article of furniture.

As noted above, the female couplers 300a, 300b may be compressed when positioned within the board 100b, which causes the outer surface of the male couplers 200a to frictionally contact the inner surface of the female couplers 300b. The frictional contact between the outer surfaces of the male couplers 200a and the inner surfaces of the female couplers 300b helps to prevent the male couplers 200a from sliding back towards the insertion portions 306b of the cavities 305b of the female couplers 300b. Rather, a user or some other external force must be applied in order to remove the male couplers 200a from the nesting portions 307b of the female couplers 300b.

Referring to FIGS. 11A-11D, a male coupler 400 and a female coupler 500 are illustrated in accordance with an alternative embodiment of the present invention. The male and female couplers 400, 500 may be coupled to a board in the same manner as was described above. Thus, the male and female couplers 400, 500 may be made to interact to couple a plurality of boards together to form an assembled article of furniture. The male coupler 400 is identical to the male coupler 200 except with regard to the structure of the second portion 420 of the male coupler 400. Similarly, the female coupler 500 is identical to the female coupler 300 except with regard to the structure of the inner surface 504 of the female coupler 500. Although no barbs are shown on the female coupler 500, they may be included in some embodiments just as they are for the female coupler 300.

In this embodiment, the second portion 420 of the male coupler 400 comprises a plurality of ring-like protrusions 421 and the inner surface 504 of the female coupler 500 comprises a plurality of notches 509 that receive the ring-like protrusions 421 as the male coupler 400 slides within the cavity 505 of the female couple 500. Thus, engagement between the ring-like protrusions 421 of the male coupler 400 and the notches 509 of the female coupler 500 prevents the male coupler 400 from being axially separated from the female coupler 500 in the same manner as that which was described above. Thus, the structure of the first and second engagement features is somewhat altered in this embodiment as compared to the one previously described.

FIGS. 12A-12D illustrate yet another embodiment of a male coupler 600 and a female coupler 700. The male and female couplers 600, 700 can be coupled to a board in the same manner as described above with regard to the male and female couplers 200, 300. The male and female couplers 600, 700 may be made to interact to couple a plurality of boards together to form an assembled article of furniture. Again, the only difference between the male coupler 600 and the male coupler 200 is with regard to the shape of the portion that interacts with the female coupler 700 and vice versa. Specifically, in this embodiment the engagement is more of a traditional dovetail-type joint. However, despite the change in shape, the function and operation remains the same as that which was described above. Thus, the structure of the first and second engagement features is somewhat altered in this embodiment as compared to the one previously described.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A furniture assembly comprising:
a first furniture part comprising:
a first board having at least one first aperture; and
at least one male coupler coupled to the first board, the male coupler being monolithic and extending from a first end to a second end along a first longitudinal axis, the male coupler comprising a first portion that includes the first end and a second portion that includes the second end, the first portion being positioned within the first aperture of the first board and the second portion protruding from the first board and comprising at least one first engagement feature;
a second furniture part comprising:
a second board comprising a front surface having at least one second aperture; and
at least one female coupler coupled to the second board, the female coupler being elongated along a second longitudinal axis and comprising:
a bottom end and a top end, the female coupler positioned within the second aperture so that the top end is flush with the front surface of the second board; and
an inner surface that defines a cavity having a cavity axis and comprising an insertion portion, a nesting portion, and a locking portion, a width of the cavity measured in a direction transverse to the second longitudinal axis increasing from a first end of the nesting portion that is adjacent to the insertion portion to a second end of the nesting portion that is adjacent to the locking portion, wherein along the nesting and locking portions the inner surface comprises a middle portion, a lower portion extending from the middle portion to the bottom end of the female coupler along a first plane that is oriented at an acute angle relative to the cavity axis, and an upper portion extending from the middle portion to the top end of the female coupler along a second plane that is oriented at an acute angle relative to the cavity axis; and
wherein the second portion of the male coupler is inserted into the insertion portion of the cavity of the female coupler and then slid to the locking portion of the cavity in a direction of the second longitudinal axis of the female coupler, the inner surface of the female coupler along the nesting and locking portions forming at least one second engagement feature that mates with the first engagement feature of the male coupler to couple the first and second furniture parts to one another; and
wherein the female coupler is compressed inwardly towards the second longitudinal axis by a sidewall of the second aperture of the second board to reduce the width of the cavity at the first end of the nesting portion thereby creating a snap-over feature that locks the male coupler to the female coupler as the male coupler slides past the snap-over feature.

2. The furniture assembly according to claim 1 wherein the first portion of the male coupler comprises a plurality of barbs that engage a sidewall of the first aperture to couple the male coupler to the first board, and wherein an outer surface of the female coupler comprises a plurality of barbs that engage a sidewall of the second aperture to couple the female coupler to the second board.

3. The furniture assembly according to claim 1 wherein the inner surface of the female coupler comprises a first portion located on a first side of the second longitudinal axis and a second portion located on a second side of the second longitudinal axis, and wherein the first and second portions of the inner surface of the female coupler diverge from one another as they extend from the first end of the nesting portion to the second end of the nesting portion.

4. The furniture assembly according to claim 1 wherein the first engagement feature comprises a groove and the second engagement feature comprises a protuberance.

5. The furniture assembly according to claim 1 wherein the second portion of the male coupler has an hourglass shape comprising a waist portion that forms the first engagement feature and wherein the inner surface of the female coupler has a protuberance along the nesting portion of the cavity that forms the second engagement feature, and wherein the protuberance is configured to nest within the waist portion to couple the male and female couplers to one another.

6. The furniture assembly according to claim 1 wherein the female coupler is a solid structure that is free of any apertures extending in a direction of the cavity axis, and wherein the male coupler is a solid structure that is free of any apertures extending in a direction of the first longitudinal axis.

7. The furniture assembly according to claim 1 wherein each of the first and second planes intersects the cavity axis at a location that is external to the cavity.

8. The furniture assembly according to claim 1 wherein the second portion of the male coupler comprises an upper portion that is adjacent to the first portion of the male coupler and a lower portion that extends to an end of the male coupler, the upper and lower portion converging at a waist portion, and wherein the inner surface of the female coupler along the nesting portion of the cavity comprises the upper portion that extends from the top end of the female coupler to an apex formed by the middle portion of the inner surface and the lower portion that extends from the bottom end of the female coupler to the apex, the apex of the inner surface of the nesting portion of the female coupler nesting within the waist portion of the second portion of the male coupler when the male and female couplers are coupled together.

9. The furniture assembly according to claim 1 wherein the first and second boards are formed from fiberboard and wherein the male and female couplers are formed from plastic.

10. The furniture assembly according to claim 1 wherein the first portion of the male coupler forms a first axial portion of the male coupler and the second portion of the male coupler forms a second axial portion of the male coupler, the first and second axial portions extending along the first longitudinal axis without overlapping, and wherein the second portion of the male coupler and the nesting and locking portions of the cavity of the female coupler have an hourglass shape.

11. A furniture assembly comprising:
a first furniture part comprising:
a first board having at least one first aperture; and
at least one male coupler coupled to the first board, the male coupler being monolithic and extending from a first end to a second end along a first longitudinal axis, the male coupler comprising a first portion that includes the first end and a second portion that includes the second end, the first portion being positioned within the first aperture of the first board and the second portion protruding from the first board and comprising at least one first engagement feature;

a second furniture part comprising:
a second board comprising a front surface having at least one second aperture; and
at least one female coupler coupled to the second board, the female coupler being elongated along a second longitudinal axis and comprising:
a bottom end and a top end, the female coupler positioned within the second aperture so that the top end is flush with the front surface of the second board; and
an inner surface that defines a cavity having a cavity axis and comprising an insertion portion, a nesting portion, and a locking portion, a width of the cavity measured in a direction transverse to the second longitudinal axis increasing from a first end of the nesting portion that is adjacent to the insertion portion to a second end of the nesting portion that is adjacent to the locking portion, wherein along the nesting and locking portions the inner surface comprises a middle portion, a lower portion extending from the middle portion to the bottom end of the female coupler along a first plane that is oriented at an acute angle relative to the cavity axis, and an upper portion extending from the middle portion to the top end of the female coupler along a second plane that is oriented at an acute angle relative to the cavity axis; and wherein the second portion of the male coupler is inserted into the insertion portion of the cavity of the female coupler and then slid to the locking portion of the cavity in a direction of the second longitudinal axis of the female coupler, the inner surface of the female coupler along the nesting and locking portions forming at least one second engagement feature that mates with the first engagement feature of the male coupler to couple the first and second furniture parts to one another; and wherein the female coupler comprises an outer surface opposite the inner surface, and wherein when the female coupler is disposed within the second aperture of the second board, the second board applies a compressive force onto the female coupler such that the outer surface of the female coupler takes on a concave shape in a direction of the second longitudinal axis.

12. A furniture assembly comprising:
a first furniture part comprising:
a first board having at least one first aperture defined at least in part by a sidewall; and
at least one male coupler comprising a first portion positioned within the first aperture and a second portion protruding from the first board, the first portion comprising a plurality of barbs that engage the sidewall of the first aperture to couple the male coupler to the first board;

a second furniture part comprising:
a second board comprising a surface having at least one second aperture defined by a sidewall; and
at least one female coupler positioned within the second aperture, the female coupler being elongated along a longitudinal axis and comprising a body portion comprising a top end that is flush with the surface of the second board, a bottom end, an outer surface comprising a plurality of barbs that engage the sidewall of the second aperture to couple the female coupler to the second board, and an inner surface that defines a cavity, the cavity comprising a first opening at the top end, a second opening at the bottom end, an insertion portion, and a nesting portion;

wherein the second portion of the male coupler is inserted through one of the first and second openings and into the insertion portion of the cavity of the female coupler in a first direction and then slid from the insertion portion of the cavity to the nesting portion of the cavity in a second direction that is perpendicular to the first direction, the inner surface of the female coupler along the nesting portion engaging the second portion of the male coupler to couple the first and second furniture parts to one another; and wherein the body portion of the female coupler is compressed by the sidewall of the second aperture of the second board in a direction towards the longitudinal axis to force the inner surface of the female coupler to frictionally engage an outer surface of the second portion of the male coupler as the male coupler slides within the nesting portion of the cavity.

13. The furniture assembly according to claim 12 wherein once the male coupler is positioned within the nesting portion of the cavity of the female portion, the male portion cannot be detached from the female portion without first sliding the male coupler to the insertion portion of the cavity.

14. The furniture assembly according to claim 12 wherein there are no adhesive materials coupling the male and female couplers to the first and second boards, respectively, and wherein the male and female couplers are not welded to the first and second boards, respectively.

15. The furniture assembly according to claim 12 wherein the second portion of the male coupler comprises at least one groove and wherein, along the nesting portion of the female coupler, the inner surface of the female coupler comprises at least one protuberance that nests within the groove when the second portion of the male coupler is positioned within the nesting portion of the cavity of the female coupler to prevent detachment of the male coupler from the female coupler without first sliding the male coupler back to the insertion portion of the cavity of the female coupler, wherein a distance between an apex of the protuberance and the top end of the female coupler is constant along the nesting portion of the cavity such that the apex lies on a first plane and the top end of the female coupler lies on a second plane that is parallel to the first plane.

16. The furniture assembly according to claim 12 wherein the female coupler is elongated along a longitudinal axis, a first portion of the inner surface of the female coupler being located on a first side of the longitudinal axis and a second portion of the inner surface of the female coupler being located on a second side of the longitudinal axis, and wherein along the nesting portion the first and second portions of the inner surface of the female coupler diverge with increasing distance from the insertion portion.

17. The furniture assembly according to claim 12 wherein the second portion of the male coupler comprises an upper portion that is adjacent to the first portion of the male coupler and a lower portion that extends to an end of the male coupler, the upper and lower portions converging at a waist portion, and wherein along the nesting portion, the inner surface of the female coupler comprises a first portion that extends from the top end to an apex and a second portion that extends from the bottom end to the apex, the apex of the inner surface of the nesting portion of the female coupler nesting within the waist region of the second portion of the male coupler when the male and female couplers are coupled together, wherein the cavity extends from the first opening to the second opening along a cavity axis, wherein the first portion of the inner surface of the female coupler extends along a first plane that is angled relative to the cavity axis and wherein the second portion of the inner surface of the female coupler extends along a second plane that is angled relative to the cavity axis, the first and second planes intersecting at the apex at an obtuse angle.

18. The furniture assembly according to claim 12 wherein the sidewall of the second aperture of the second board applies compressive forces onto the outer surface of the female coupler thereby causing sidewalls of the body portion of the female coupler to deflect inwardly towards the cavity, wherein the compressive forces on the outer surface of the female coupler cause the outer surface of the body portion of the female coupler to deform into a concave shape in a direction of the longitudinal axis and the inner surface of the body portion of the female coupler to deform into a convex shape in the direction of the longitudinal axis.

* * * * *